United States Patent
Arizono et al.

(10) Patent No.: US 10,194,057 B2
(45) Date of Patent: Jan. 29, 2019

(54) METHOD FOR LIMITING AMOUNT OF INK DISCHARGED, METHOD FOR CREATING COLOR CONVERSION TABLE, GLOSS DETERMINATION DEVICE, RECORDING MEDIUM HAVING RECORDED THEREIN GLOSS DETERMINATION PROGRAM, AND GLOSS DETERMINATION METHOD

(71) Applicant: SCREEN Holdings Co., Ltd., Kyoto (JP)

(72) Inventors: Shigenori Arizono, Kyoto (JP); Ryoko Sakurai, Kyoto (JP); Kohei Ueda, Kyoto (JP); Koji Matsuo, Kyoto (JP)

(73) Assignee: Screen Holdings Co., Ltd., Kyoto (JP)

(*) Notice: Subject to any disclaimer, the term of this patent is extended or adjusted under 35 U.S.C. 154(b) by 0 days.

(21) Appl. No.: 15/209,223

(22) Filed: Jul. 13, 2016

(65) Prior Publication Data
US 2017/0015107 A1    Jan. 19, 2017

(30) Foreign Application Priority Data

Jul. 15, 2015  (JP) ................................. 2015-141170
Sep. 28, 2015  (JP) ................................. 2015-189890

(51) Int. Cl.
*H04N 1/60* (2006.01)
*B41J 2/205* (2006.01)
(Continued)

(52) U.S. Cl.
CPC .......... *H04N 1/605* (2013.01); *B41J 2/2054* (2013.01); *B41J 2/2103* (2013.01);
(Continued)

(58) Field of Classification Search
CPC ..... H04N 1/605; H04N 1/6022; B41J 2/2103; B41J 11/0015; B41J 2/2054; B41J 11/002
See application file for complete search history.

(56) References Cited

U.S. PATENT DOCUMENTS

2004/0004644 A1* 1/2004 Komatsu ................. B41J 2/2128
347/15
2012/0062665 A1 3/2012 Roof et al.
(Continued)

FOREIGN PATENT DOCUMENTS

EP    1826005 A1    8/2007
EP    2674300 A1    12/2013
(Continued)

*Primary Examiner* — Yaovi M Ameh
(74) *Attorney, Agent, or Firm* — McDermott, Will & Emery LLP

(57) ABSTRACT

A method for limiting the amount of ink discharged in a photocurable inkjet printing apparatus includes a conversion step of converting, an input grayscale value to the amount of ink; and a limit value setting step of setting, a limit value of the amount of ink discharged, for each of a secondary color not including a K color component, a tertiary color not including a K color component, and a color including a K color component. In the limit value setting step, the limit value for the tertiary color not including a K color component is set to a smaller value than the limit value for the secondary color not including a K color component, and the limit value for the color including a K color component is set to a smaller value than the limit value for the secondary color not including a K color component.

6 Claims, 20 Drawing Sheets

| TYPE OF BASE MATERIAL | SPEED MODE | COMBINATION OF COLORS | APPROPRIATE AMOUNT OF INK |
|---|---|---|---|
| WHITE FILM | STANDARD (HIGH SPEED) | SECONDARY COLOR | 200 |
| | | TERTIARY COLOR | 160 |
| | | INCLUDING K COLOR COMPONENT | 120 |
| | HIGH QUALITY (LOW SPEED) | SECONDARY COLOR | 200 |
| | | TERTIARY COLOR | 170 |
| | | INCLUDING K COLOR COMPONENT | 140 |
| TRANSPARENT FILM | ••• | ••• | ••• |
| PAPER | ••• | ••• | ••• |

(51) Int. Cl.
*B41J 2/21* (2006.01)
*B41J 11/00* (2006.01)

(52) U.S. Cl.
CPC ........ *B41J 11/0015* (2013.01); *H04N 1/6022*
(2013.01); *B41J 11/002* (2013.01)

(56) References Cited

U.S. PATENT DOCUMENTS

| | | | |
|---|---|---|---|
| 2012/0281049 A1 | 11/2012 | Kachi | |
| 2013/0222467 A1* | 8/2013 | Ooishi | B41J 2/2114 347/21 |
| 2015/0373228 A1 | 12/2015 | Ukishima | |

FOREIGN PATENT DOCUMENTS

| | | |
|---|---|---|
| JP | 2012-232529 A | 11/2012 |
| JP | 2013-116605 A | 6/2013 |
| WO | 2014/156603 A1 | 10/2014 |

\* cited by examiner

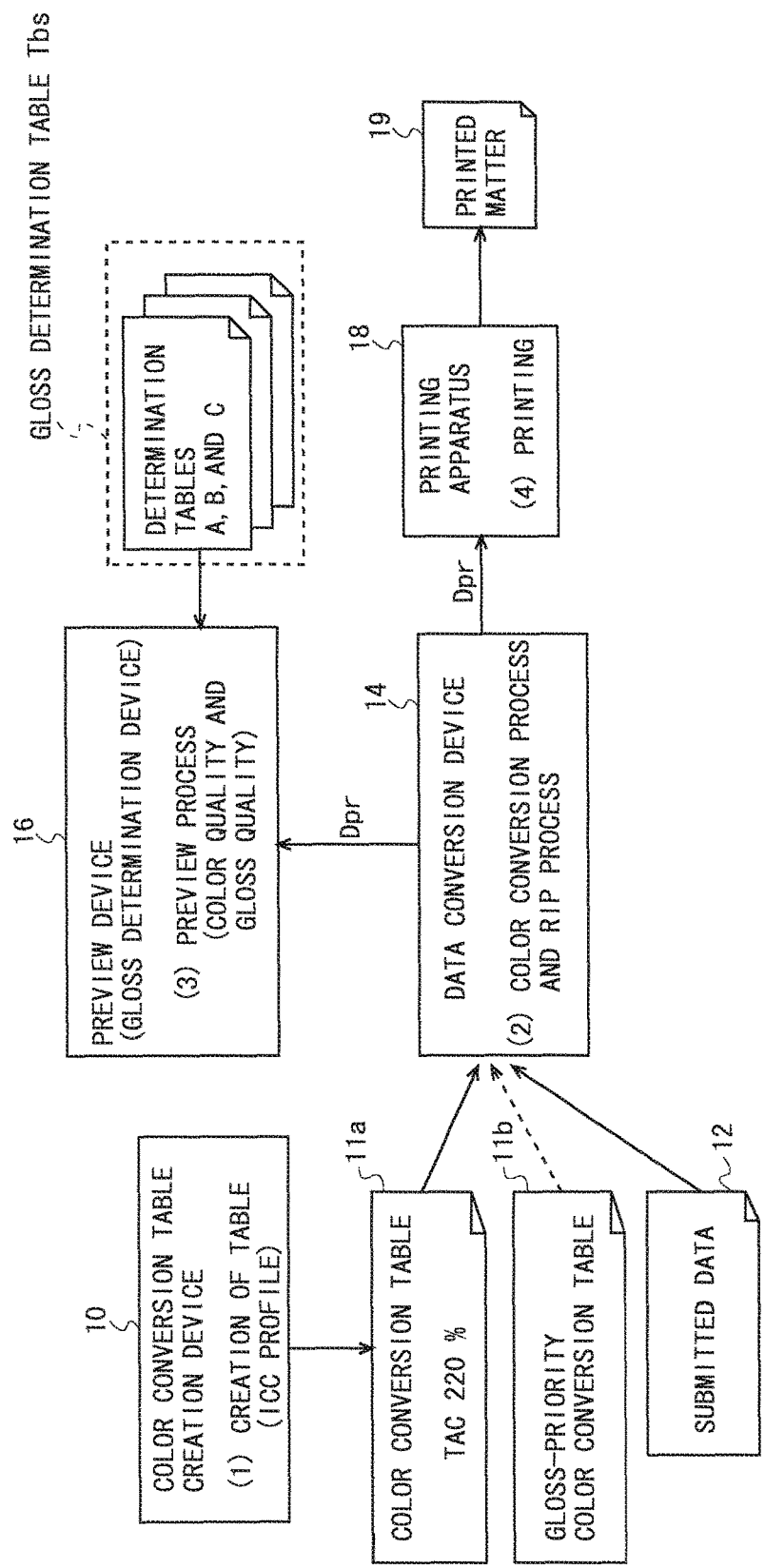

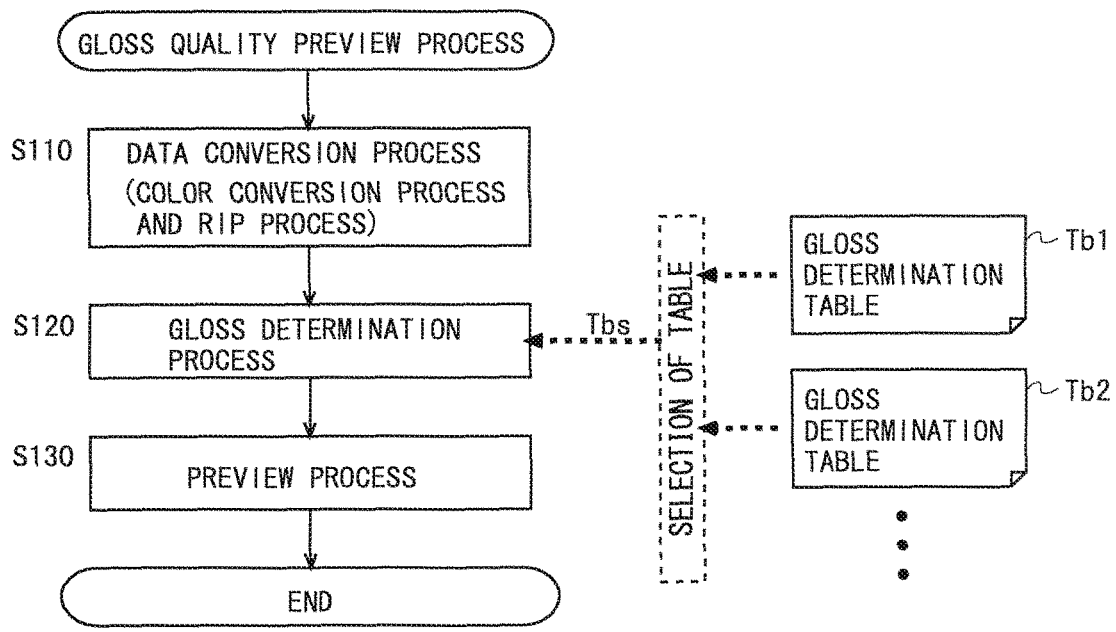

Fig.7

| TYPE OF BASE MATERIAL | SPEED MODE | COMBINATION OF COLORS | APPROPRIATE AMOUNT OF INK |
|---|---|---|---|
| WHITE FILM | STANDARD (HIGH SPEED) | SECONDARY COLOR | 200 |
| | | TERTIARY COLOR | 160 |
| | | INCLUDING K COLOR COMPONENT | 120 |
| | HIGH QUALITY (LOW SPEED) | SECONDARY COLOR | 200 |
| | | TERTIARY COLOR | 170 |
| | | INCLUDING K COLOR COMPONENT | 140 |
| TRANSPARENT FILM | ... | ... | ... |
| PAPER | ... | ... | ... |

Fig.8

| STANDARD DEVIATION (TERTIARY COLOR) | 47.14 | 42.43 | 37.71 | 33 | 28.28 | 23.57 | 18.86 | 14.14 | 9.43 | 4.71 | 0 |
|---|---|---|---|---|---|---|---|---|---|---|---|
| 0 | 200 | 181.4 | 176.6 | 173.2 | 170.5 | 168.3 | 166.3 | 164.5 | 162.9 | 161.4 | 160 |
| 10 | 192 | 173.4 | 168.6 | 165.2 | 162.5 | 160.3 | 158.3 | 156.5 | 154.9 | 153.4 | 150 |
| 20 | 184 | 165.4 | 160.6 | 157.2 | 154.5 | 152.3 | 150.3 | 148.5 | 146.9 | 145.4 | 144 |
| 30 | 176 | 157.4 | 152.6 | 149.2 | 146.5 | 144.3 | 142.3 | 140.5 | 138.9 | 137.4 | 136 |
| 40 | 168 | 149.4 | 144.6 | 141.2 | 138.5 | 136.3 | 134.3 | 132.5 | 130.9 | 129.4 | 128 |
| 50 | 160 | 141.4 | 136.6 | 133.2 | 130.5 | 128.3 | 126.3 | 124.5 | 122.9 | 121.4 | 120 |
| 60 | 152 | 133.4 | 128.6 | 125.2 | 122.5 | 120.3 | 120 | 120 | 120 | 120 | 120 |
| 70 | 144 | 125.4 | 120.6 | 120 | 120 | 120 | 120 | 120 | 120 | 120 | 120 |
| 80 | 136 | 120 | 120 | 120 | 120 | 120 | 120 | 120 | 120 | 120 | 120 |
| 90 | 128 | 120 | 120 | 120 | 120 | 120 | 120 | 120 | 120 | 120 | 120 |
| 100 | 120 | 120 | 120 | 120 | 120 | 120 | 120 | 120 | 120 | 120 | 120 |

AMOUNT OF K COLOR COMPONENT

Fig.9

| STANDARD DEVIATION (SECONDARY COLOR) | 50 | 45 | 40 | 35 | 30 | 25 | 20 | 15 | 10 | 5 | 0 |
|---|---|---|---|---|---|---|---|---|---|---|---|
| 0 | 200 | 200 | 200 | 200 | 200 | 200 | 200 | 200 | 200 | 200 | 200 |
| 10 | 192 | 192 | 192 | 192 | 192 | 192 | 192 | 192 | 192 | 192 | 192 |
| 20 | 184 | 184 | 184 | 184 | 184 | 184 | 184 | 184 | 184 | 184 | 184 |
| 30 | 176 | 176 | 176 | 176 | 176 | 176 | 176 | 176 | 176 | 176 | 176 |
| 40 | 168 | 168 | 168 | 168 | 168 | 168 | 168 | 168 | 168 | 168 | 168 |
| 50 | 160 | 160 | 160 | 160 | 160 | 160 | 160 | 160 | 160 | 160 | 160 |
| 60 | 152 | 152 | 152 | 152 | 152 | 152 | 152 | 152 | 152 | 152 | 152 |
| 70 | 144 | 144 | 144 | 144 | 144 | 144 | 144 | 144 | 144 | 144 | 144 |
| 80 | 136 | 136 | 136 | 136 | 136 | 136 | 136 | 136 | 136 | 136 | 136 |
| 90 | 128 | 128 | 128 | 128 | 128 | 128 | 128 | 128 | 128 | 128 | 128 |
| 100 | 120 | 120 | 120 | 120 | 120 | 120 | 120 | 120 | 120 | 120 | 120 |

AMOUNT OF K COLOR COMPONENT

Fig.10

| AMOUNT OF COLOR COMPONENT OF PRIMARY COLOR | 0 | 10 | 20 | 30 | 40 | 50 | 60 | 70 | 80 | 90 | 100 |
|---|---|---|---|---|---|---|---|---|---|---|---|
| 0 | 200 | 200 | 200 | 200 | 200 | 200 | 200 | 200 | 200 | 200 | 200 |
| 10 | 192 | 192 | 192 | 192 | 192 | 192 | 192 | 192 | 192 | 192 | 192 |
| 20 | 184 | 184 | 184 | 184 | 184 | 184 | 184 | 184 | 184 | 184 | 184 |
| 30 | 176 | 176 | 176 | 176 | 176 | 176 | 176 | 176 | 176 | 176 | 176 |
| 40 | 168 | 168 | 168 | 168 | 168 | 168 | 168 | 168 | 168 | 168 | 168 |
| 50 | 160 | 160 | 160 | 160 | 160 | 160 | 160 | 160 | 160 | 160 | 160 |
| 60 | 152 | 152 | 152 | 152 | 152 | 152 | 152 | 152 | 152 | 152 | 152 |
| 70 | 144 | 144 | 144 | 144 | 144 | 144 | 144 | 144 | 144 | 144 | 144 |
| 80 | 136 | 136 | 136 | 136 | 136 | 136 | 136 | 136 | 136 | 136 | 136 |
| 90 | 128 | 128 | 128 | 128 | 128 | 128 | 128 | 128 | 128 | 128 | 128 |
| 100 | 120 | 120 | 120 | 120 | 120 | 120 | 120 | 120 | 120 | 120 | 120 |

AMOUNT OF K COLOR COMPONENT

Fig.11

| | X= | 100 | 100 | 100 | 100 | 100 | ... | 100 | 100 |
|---|---|---|---|---|---|---|---|---|---|
| | Y= | 100 | 100 | 100 | 100 | 100 | ... | 100 | 100 |
| | Z= | 0 | 10 | 20 | 30 | ... | 90 | 100 |
| STANDARD DEVIATION (TERTIARY COLOR) | | 47.14 | 42.43 | 37.71 | 33 | ... | 4.71 | 0 |
| AMOUNT OF K COLOR COMPONENT | 0 | 200 | 181.4 | 176.6 | 173.2 | ... | 161.4 | 160 |
| | 10 | 192 | 173.4 | 168.6 | 165.2 | ... | 153.4 | 150 |
| | 20 | 184 | 165.4 | 160.6 | 157.2 | ... | 145.4 | 144 |
| | ... | ... | ... | ... | ... | ... | ... | ... |
| | 90 | 128 | 120 | 120 | 120 | ... | 120 | 120 |
| | 100 | 120 | 120 | 120 | 120 | ... | 120 | 120 |

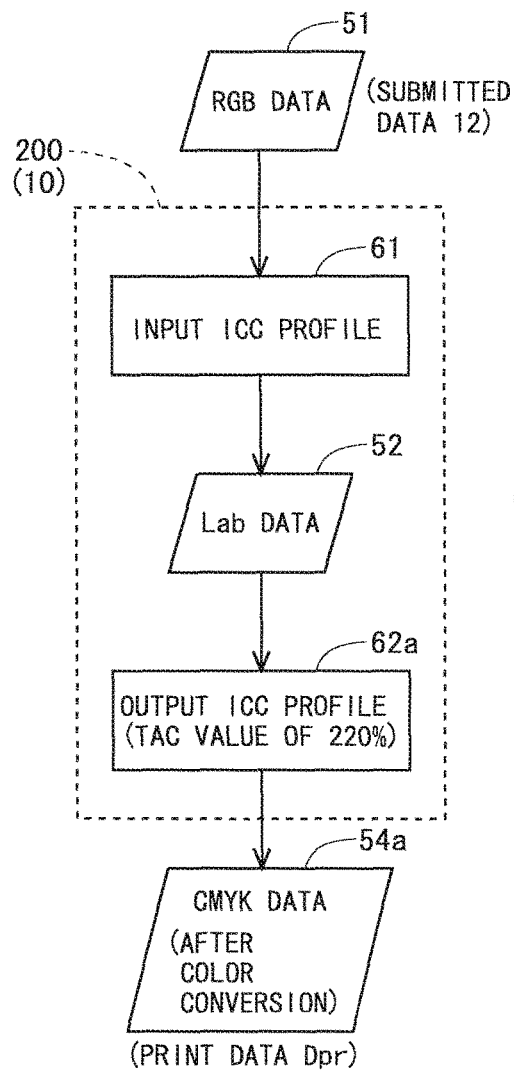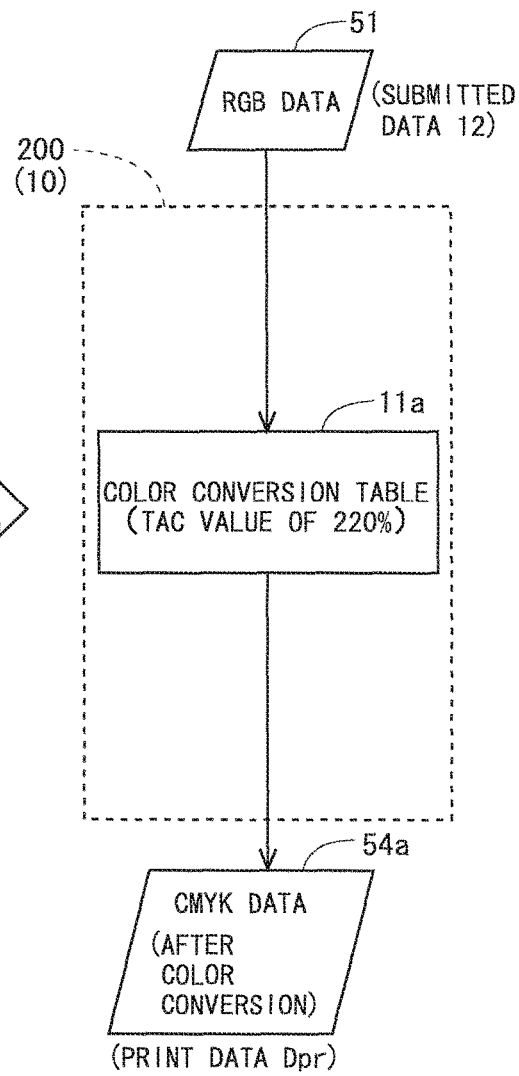

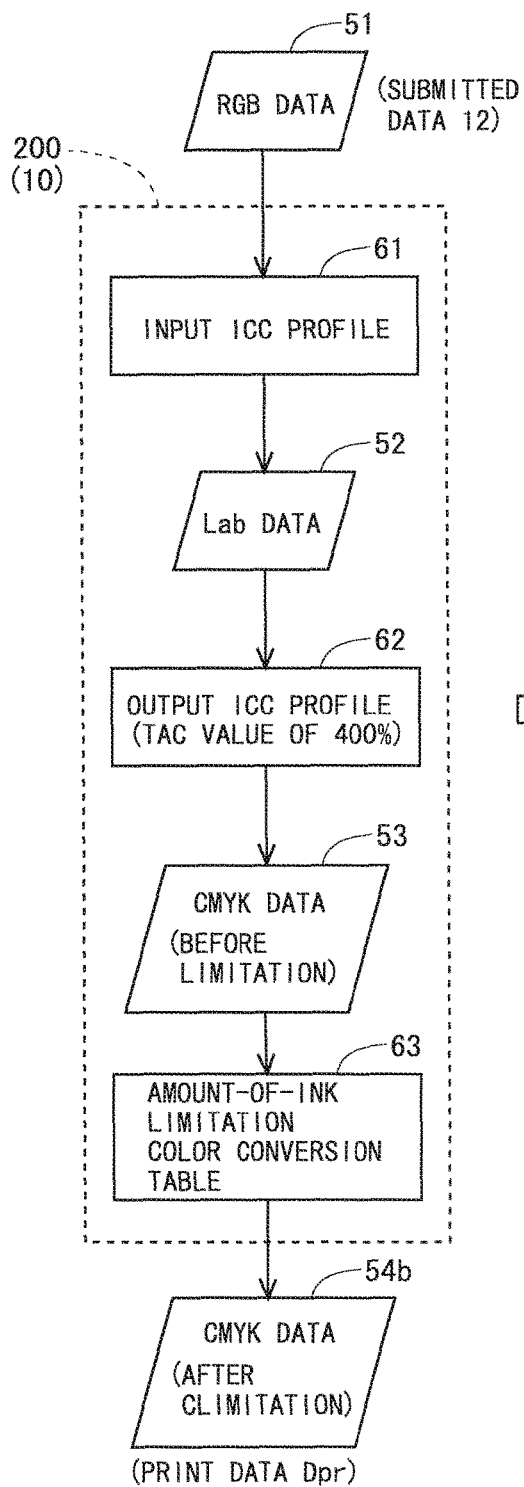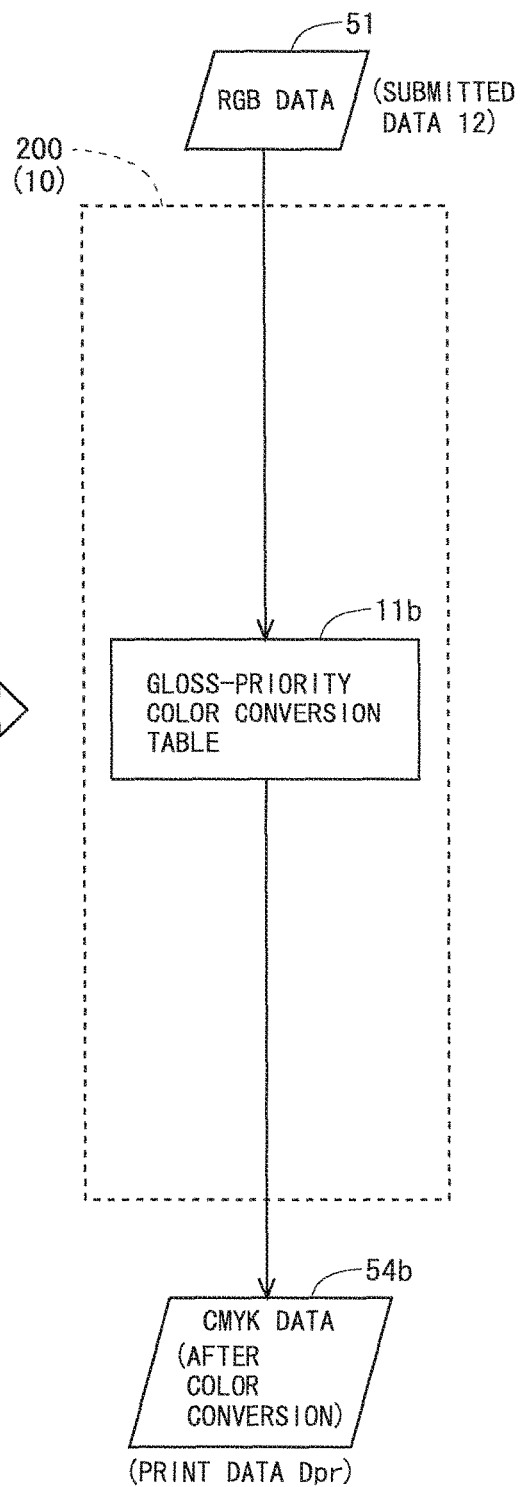

Fig.16
| COLOR | LIMIT VALUE |
|---|---|
| SECONDARY COLOR (CM, MY, YC) | 200% |
| TERTIARY COLOR (CMY) | 160% |
| COLOR INCLUDING K | 120% |
Fig.17
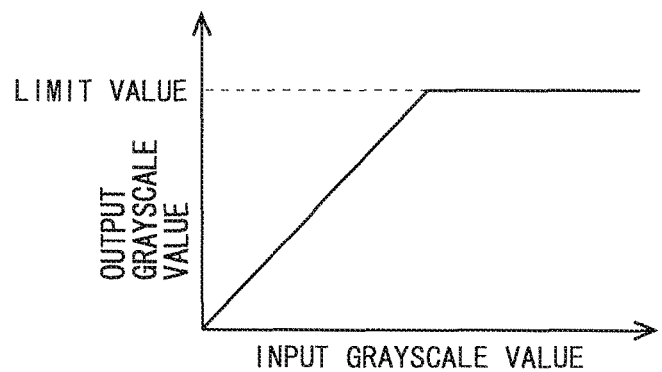
Fig.18
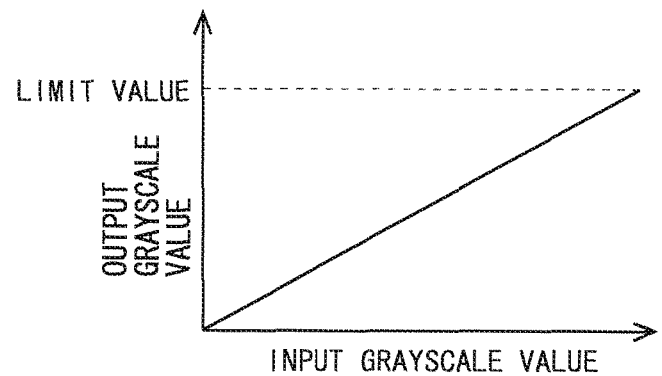

Fig.21

| TYPE OF BASE MATERIAL | SPEED MODE | COMBINATION OF COLORS | APPROPRIATE AMOUNT OF INK (1) [%] | APPROPRIATE AMOUNT OF INK (2) [%] |
|---|---|---|---|---|
| WHITE FILM | STANDARD (HIGH SPEED) | SECONDARY COLOR | 200 | 200 |
| | | TERTIARY COLOR | 160 | 170 |
| | | INCLUDING K COLOR COMPONENT | 120 | 125 |
| | HIGH QUALITY (LOW SPEED) | SECONDARY COLOR | 200 | 200 |
| | | TERTIARY COLOR | 170 | 180 |
| | | INCLUDING K COLOR COMPONENT | 140 | 150 |
| TRANSPARENT FILM | ... | ... | ... | ... |
| PAPER | ... | ... | ... | ... |

Fig.22

| X= | 100 | 100 | 100 | 100 | 100 | 100 | 100 | 100 | 100 | 100 | 100 |
|---|---|---|---|---|---|---|---|---|---|---|---|
| Y= | 100 | 100 | 100 | 100 | 100 | 100 | 100 | 100 | 100 | 100 | 100 |
| Z= | 0 | 10 | 20 | 30 | 40 | 50 | 60 | 70 | 80 | 90 | 100 |
| STANDARD DEVIATION (TERTIARY COLOR) | 47.14 | 42.43 | 37.71 | 33 | 28.28 | 23.57 | 18.86 | 14.14 | 9.43 | 4.71 | 0 |
| AMOUNT OF K COLOR COMPONENT | | | | | | | | | | | |
| 0 | 200 | 186.1 | 182.5 | 179.9 | 177.9 | 176.2 | 174.7 | 173.4 | 172.2 | 171.0 | 170 |
| 10 | 192.5 | 178.6 | 175 | 172.4 | 170.4 | 168.7 | 167.2 | 165.9 | 164.7 | 163.5 | 162.5 |
| 20 | 185 | 171.1 | 167.5 | 164.9 | 162.9 | 161.2 | 159.7 | 158.4 | 157.2 | 156.0 | 155 |
| 30 | 177.5 | 163.6 | 160 | 157.4 | 155.4 | 153.7 | 152.2 | 150.9 | 149.7 | 148.5 | 147.5 |
| 40 | 170 | 156.1 | 152.5 | 149.9 | 147.9 | 146.2 | 144.7 | 143.4 | 142.2 | 141.0 | 140 |
| 50 | 162.5 | 148.6 | 145 | 142.4 | 140.4 | 138.7 | 137.2 | 135.8 | 134.7 | 133.5 | 132.5 |
| 60 | 155 | 141.1 | 137.5 | 134.9 | 132.9 | 131.2 | 129.7 | 128.4 | 127.2 | 126.0 | 125 |
| 70 | 147.5 | 133.6 | 130 | 127.4 | 125.4 | 125 | 125 | 125 | 125 | 125 | 125 |
| 80 | 140 | 126.1 | 125 | 125 | 125 | 125 | 125 | 125 | 125 | 125 | 125 |
| 90 | 132.5 | 125 | 125 | 125 | 125 | 125 | 125 | 125 | 125 | 125 | 125 |
| 100 | 125 | 125 | 125 | 125 | 125 | 125 | 125 | 125 | 125 | 125 | 125 |

US 10,194,057 B2

METHOD FOR LIMITING AMOUNT OF INK DISCHARGED, METHOD FOR CREATING COLOR CONVERSION TABLE, GLOSS DETERMINATION DEVICE, RECORDING MEDIUM HAVING RECORDED THEREIN GLOSS DETERMINATION PROGRAM, AND GLOSS DETERMINATION METHOD

BACKGROUND OF THE INVENTION

Field of the Invention

The present invention relates to a method for limiting the amount of ink discharged when a photocurable inkjet printing apparatus performs printing, and a gloss determination device for verifying the gloss quality of printed matter which is produced by the photocurable inkjet printing apparatus.

Description of Background Art

Conventionally, there is known an inkjet printing apparatus that performs printing by discharging ink onto a base material (printing paper, etc.). The inkjet printing apparatus generally uses water-based ink. However, in recent years, development of a photocurable (ultraviolet-curable) inkjet printing apparatus using ultraviolet-curable ink (UV ink) has progressed. The photocurable inkjet printing apparatus performs printing by irradiating UV ink discharged onto a base material with ultraviolet light (UV light).

An inkjet printing apparatus that performs color printing generally performs printing using inks of four colors, cyan (C), magenta (M), yellow (Y), and black (K). Note that in the following the above-described four colors are referred to as "ink colors" in order to distinguish them from colors represented by combinations of the four colors. Meanwhile, when the photocurable inkjet printing apparatus uses an appropriate amount of ink, the finish of printed matter has a glossy look (high gloss). However, when the photocurable inkjet printing apparatus uses a large amount of ink at a time, ink curing failure may occur due to the characteristics of the ink, the hygroscopic properties of a base material, etc. When ink curing failure thus occurs, a surface of printed matter becomes nonuniform and accordingly the finish of the printed matter has a matte look (low gloss).

Hence, in order to obtain printed matter with a glossy look without causing ink curing failure, the maximum amount of ink (the total amount of inks of four CMYK colors that overlap each other in one pixel) is limited by a Total Area Coverage (TAC value) of an ICC profile. Note that the ICC profile refers to a document file that is set by the International Color Consortium to perform color space conversion and that defines the characteristics of a device's color space. By performing color data conversion using the ICC profile, colors can be reproduced as faithful as possible between different devices.

The above-described TAC value is set to, for example, "320%" with the maximum value of each ink color being 100%. In this case, a color that is supposed to be represented by (C value, M value, Y value, K value)=(95, 85, 95, 90) when subjected to conversion from RGB data to CMYK data is subjected to color data conversion such that the total value of the four ink colors does not exceed 320%. By thus imposing a limit on the total amount of the four color inks per pixel, ink curing failure is prevented.

Note that in relation to the present invention, U.S. Unexamined Patent Application Publication No. 2012/0281049 discloses an inkjet recording apparatus configured such that provisional curing light sources are provided separately from main curing light sources in order to obtain a desired glossy feel. In addition, Japanese Unexamined Patent Application Publication No. 2013-116605 discloses a thermal transfer printing apparatus that uses a thermal head. The printing apparatus determines an area with a predetermined density or more for each ink color as a non-glossy area, in print data.

Upon limiting the maximum amount of ink, the TAC value is set to the value of the total amount of the four color inks without taking into account the characteristics of ink, for each ink color (i.e., a value that does not take into account allocation of the four color inks). Hence, depending on the allocation of the four color inks, ink curing failure may occur. That is, there are colors that cause ink curing failure when colors that cause ink curing failure are included in a print target image, the finish of printed matter includes both a glossy-look portion and a matte-look portion, and thus, entirely uniform printed matter cannot be obtained.

In addition, in the inkjet recording apparatus disclosed in U.S. Unexamined Patent Application Publication No. 2012/0281049, the amount of irradiation light is set for each irradiation unit provided for a corresponding nozzle group, and the provisional curing light sources are controlled for each irradiation unit based on the set amounts of irradiation light. Since the configuration is such that, control according to the content of a print target image cannot be performed. In addition, since the provisional curing light sources are required separately from the main curing light sources, cost increases.

Hence, implementation of a method for obtaining printed matter with a glossy look without causing ink curing failure is sought. Further, implementation of a method for effectively obtaining such a printed matter with a glossy look is also sought.

SUMMARY OF THE INVENTION

An object of the present invention is therefore to enable obtaining entirely-glossy-look, uniform printed matter without causing ink curing failure. In addition, another object of the present invention is to provide a gloss determination device capable of evaluating the gloss quality of printed matter before performing printing using photocurable ink (UV printing, etc.), and the like.

To attain the above-described objects, the present invention has features such as those shown below.

One aspect of the present invention is directed to a method for limiting an amount of ink discharged in a photocurable inkjet printing apparatus that performs printing using inks of four CMYK colors, the method including:

a conversion step of converting, for each ink color, an input grayscale value to an amount of ink; and a limit value setting step of setting, regarding the amount of ink obtained in the conversion step, a limit value of an amount of ink discharged, for each of a secondary color not including a K color component, a tertiary color not including a K color component, and a color including a K color component, wherein in the limit value setting step, the limit value for the tertiary color not including a K color component is set to a smaller value than the limit value for the secondary color not including a K color component, and the limit value for the color including a K color component is set to a smaller value than the limit value for the secondary color not including a K color component.

According to such a configuration, regarding printing by a photocurable inkjet printing apparatus, a limit value of the amount of ink discharged is set for each of a secondary color not including a K color component, a tertiary color not including a K color component, and a color including a K color component. At that time, since the limit values for a color including a K color component and a color generating a gray component are set to relatively small values, curing failure can be inhibited also for colors that are conventionally likely to cause ink curing failure. Accordingly, even when printing of an image including various colors is performed, the finish of all portions of printed matter is inhibited from having a matte look. By the above, when printing is performed using the photocurable inkjet printing apparatus, entirely-glossy-look, uniform printed matter can be obtained, without causing ink curing failure.

In such a method, it is preferred that in the limit value setting step, the limit value for the color including a K color component be set to a smaller value than the limit value for the tertiary color not including a K color component.

According to such a configuration, when printing of a color including a K color component is performed, the amount of ink discharged is effectively limited. Hence, when the photocurable inkjet printing apparatus performs printing, ink curing failure is more effectively inhibited.

In such a method, it is preferred that in the conversion step, the conversion from an input grayscale value to an amount of ink be performed based on an actual amount of ink consumed when the photocurable inkjet printing apparatus has performed printing in advance.

According to such a configuration, the accuracy regarding inhibition of ink curing failure can be increased.

In such a method, it is preferred that in the limit value setting step, the limit, value of an amount of ink discharged be set for each color, depending on magnitudes of a C color component, an M color component, a Y color component, and a K color component.

According to such a configuration, the occurrence of tone jump (a phenomenon of losing grayscale continuity) is suppressed when printing is performed.

Another aspect of the present invention is directed to a method for creating a color conversion table for converting, for each of colors represented by combinations of color values of four CMYK colors, color values of the four colors serving as input grayscale values into color values of the four colors serving as output grayscale values to be provided to a photocurable inkjet printing apparatus, the method including:

a conversion step of converting, for each ink color, an input grayscale value to an amount of ink;

a limit value setting step of setting, regarding the amount of ink obtained in the conversion step, a limit value of an amount of ink discharged, for each of a secondary color not including a K color component, a tertiary color not including a K color component, and a color including a K color component; and a color value determination step of determining color values of the four colors serving as output grayscale values corresponding to color values of the four colors serving as input grayscale values such that an amount of ink discharged does not exceed a limit value set in the limit value setting step, wherein in the limit value setting step, the limit value for the tertiary color not including a K color component is set to a smaller value than the limit value for the secondary color not including a K color component, and the limit value for the color including a K color component is set to a smaller value than the limit value for the secondary color not including a K color component.

According to such a configuration, color data can be converted when print data is generated based on submitted data, such that entirely-glossy-look, uniform printed matter can be obtained without causing ink curing failure.

In such a method, it is preferred that in the color value determination step, for a color that includes a K color component and that exceeds a limit value set in the limit value setting step, color values of the four colors serving as output grayscale values be determined such that components other than the K color component are reduced on a priority basis.

According to such a configuration, a significant change in the appearance of colors (e.g., a reduction in contrast) associated with the limitations on the amounts of inks is suppressed. That is, print quality can be maintained.

A still another aspect of the present invention is directed to a gloss determination device that determines whether gloss quality of printed matter is good or not, the printed matter being obtained by performing printing using photocurable inks of color K and N colors other than the color K (N is an integer greater than or equal to 3), the device including:

a gloss determination table configured to provide a determination reference value of the gloss quality to a combination of an amount of a K color component and dispersion of amounts of components of the N colors;

a dispersion calculation unit configured to calculate, for each predetermined unit image in an image to be printed, dispersion of amounts of components of the N colors in the unit image, based on image data representing the image;

a determination reference value obtaining unit v obtain a determination reference value provided, by the gloss determination table, to a combination of an amount of a K color component included in each unit image in the image and dispersion calculated by the dispersion calculation unit for the unit image;

a total-amount-of-color-component calculations unit configured to calculate, as a total amount of color components, a sum total of amounts of components of the color K and the N colors from the image data, the color K and the N colors being included in each unit image in the image; and a determination unit configured to determine, for each unit image in the image, whether gloss quality of the printed matter is good or not by comparing the total amount of color components in the unit image with a determination reference value obtained, for the unit image, by the determination reference value obtaining unit.

According to such a configuration, using a gloss determination table that provides a determination reference value of gloss quality to a combination of the amount of a K color component and dispersion of the amounts of components of the N colors, and based on image data representing an image to be printed (print image), a determination reference value is obtained for each predetermined unit image in the print image, the determination reference value corresponding to a combination of the amount of a K color component included in the unit image and dispersion of the amounts of components of the N colors in the unit image. Then, the total amount of color components which is the sum total of the amounts of components of the color K and the N colors included in the unit image is compared with the determination reference value, by which gloss quality of printed matter is determined. Accordingly, an operator can verify beforehand whether the gloss quality of the printed matter is good or not. Thus, when it is determined, as a result of the determination, that the gloss quality is not good, image data for printing that allows to obtain good gloss quality can be regenerated without performing printing. As a result, printed matter that achieves a balance between color quality and gloss quality can be efficiently produced. In addition, since a determination reference value is obtained from a gloss determination table such as that described above, a determination as to whether gloss quality is good or not is made taking also into account the generation of a gray component based on the dispersion of the amounts of components of the N colors other than the color K, in addition to the amount of a K color component. Hence, a determination of gloss quality based on image data representing a print image can be made with a higher degree of accuracy than in conventional cases.

In such an apparatus, it is preferred that the gloss determination table includes a first to an Nth determination table, a jth determination table corresponding to an integer j associates a determination reference value of the gloss quality with a combination of an amount of a K color component and a standard deviation of amounts of color components in a jth-order color consisting of any j colors out of the N colors, the integer j being any number not less than 2 and not more than N, the first determination table associates a determination reference value of the gloss quality with a combination of an amount of a K color component and an amount of a component of any one color out of the N colors, the dispersion calculation unit calculates, when a number m of color components other than a K color component that are included in a unit image whose dispersion is to be obtained is two or more, a standard deviation of amounts of the color components of an mth-order color included in the unit image, as the dispersion, and the determination reference value obtaining unit:
obtains, when a number m of color components other than a K color component that are included in a unit image whose determination reference value is to be obtained is two or more, a determination reference value associated, by an mth determination table, with a combination of an amount of the K color component included in the unit image and a standard deviation calculated by the dispersion calculation unit for the unit image, as the determination reference value for the unit image;
obtains, when a number of color components other than a K color component that are included in a unit image whose determination reference value is to be obtained is one, a determination reference value associated, by the first determination table, with a combination an amount of the K color component included in the unit image and an amount of a color component of a primary color included in the unit image, as the determination reference value for the unit image; and
obtains, when a unit image whose determination reference value is to be obtained does not include any color component other than a K color component, a determination reference value associated, by the first determination table, with a combination of an amount of the K color component included in the unit image and "0" as an amount of a color component of a primary color included in the unit image, as the determination reference value for the unit image.

According to such a configuration, the gloss determination table includes N determination tables, and a determination reference value is obtained for each unit image in a print image, using a determination table depending on the number m of color components other than a K color component that are included in the unit image. Based on the determination reference value, a determination as to whether gloss quality is good or not is made for the unit image. Accordingly, a determination of gloss quality using image data representing a print image can be made with a higher degree of accuracy.

It is preferred that such a device further include:
an extended gloss determination table configured to provide an extended determination reference value to a combination of an amount of a K color component and dispersion of amounts of components of the N colors, the extended determination reference value being used to make a determination as to whether the gloss quality is good or not more loosely than a determination made based on the determination reference value in the gloss determination table;
an extended determination reference value obtaining unit configured to obtain an extended determination reference value provided, by the extended gloss determination table, to a combination of an amount of a K color component included in each unit image in the image and dispersion calculated by the dispersion calculation unit for the unit image; and
an extended determination unit configured to determine, for each unit image in the image, whether gloss quality of the printed matter is good or not by comparing the total amount of color components in the unit image with an extended determination reference value obtained, for the unit image, by the extended determination reference value obtaining unit.

According to such a configuration, an extended gloss determination table is used in addition to the gloss determination table. The extended gloss determination table provides an extended determination reference value to a combination of the amount of a K color component and dispersion of the amounts of components of the N colors. The extended determination reference value is used to make a determination as to whether gloss quality is good or not more loosely than a determination made based on the determination reference value of the gloss determination table. For each unit image in the print image, an extended determination reference value depending on the unit image is obtained from the extended gloss determination table, and a determination as to whether gloss quality is good or not is made based on the extended determination reference value. In this manner, a determination as to whether gloss quality is good or not is made by two criteria using the gloss determination table and the extended gloss determination table. Thus, a determination as to whether gloss quality is good or not (whether print data is to be regenerated due to poor gloss) can be made more appropriately depending on the situation regarding printed matter to be produced.

In such a device, it is preferred that the extended gloss determination table includes a first to an Nth extended determination table, a jth extended determination table corresponding to an integer j associates an extended determination reference value of the gloss quality with a combination of an amount of a K color component and a standard deviation of amounts of color components in a jth-order color consisting of any j colors out of the N colors, the integer j being any number between not less than 2 and not more than N, the first extended determination table associates an extended determination reference value of the gloss quality with a combination of an amount of a K color component and an amount of a component of any one color out of the N colors, and the extended determination reference value obtaining unit:
obtains, when a number m of color components other than a K color component that are included in a unit image whose extended determination reference value is to be obtained is two or more, an extended determination reference value associated, by an mth extended determination table, with a combination of an amount of the K color component included in the unit image and a standard deviation calculated by the dispersion calculation unit for the unit image, as the extended determination reference value for the unit image;

obtains, when a number of color components other than a K color component that are included in a unit image whose extended determination reference value is to be obtained is one, an extended determination reference value associated, by the first extended determination table, with a combination of an amount of the K color component included in the unit image and an amount of a color component of a primary color included in the unit image, as the extended determination reference value for the unit image; and obtains, when a unit image whose extended determination reference value is to be obtained does not include any color component other than a K color component, an extended determination reference value associated, by the first extended determination table, with a combination of an amount of the K color component included in the unit image and "0" as an amount of a color component of a primary color included in the unit image, as the extended determination reference value for the unit image.

According to such a configuration, the extended gloss determination table includes N extended determination tables, and an extended determination reference value is obtained for each unit image in the print image, using an extended determination table depending on the number m of color components other than a K color component that are included in the unit image. Based on the extended determination reference value, a determination as to whether gloss quality is good or not is made for the unit image. Accordingly, a determination of gloss quality based on the extended determination criterion can be made with a higher degree of accuracy.

It is preferred that such a device further include a table selection unit configured to select a gloss determination table depending on a printing condition for obtaining the printed matter from a plurality of types of gloss determination tables prepared in advance, as a gloss determination table to be used by the determination reference value obtaining unit.

According to such a configuration, a gloss determination table depending on printing conditions (the type of base material and print speed) is selected from among a plurality of types of gloss determination tables prepared in advance, and for each unit image in an image to be printed, a determination as to whether gloss quality is good or not is made based on a determination reference value obtained from the gloss determination table. Hence, even when the printing conditions are changed, a determination as to whether the gloss quality of each unit image is good or not can be appropriately made based on a determination reference value depending on the changed printing conditions.

In such a device, the N colors may be color C, color M, and color Y.

According to such a configuration, a determination as to whether the gloss quality of printed matter, which is obtained by performing printing using photocurable inks of the color K and three CMY colors, is good or not can be made beforehand with a high degree of accuracy, using image data representing an image to be printed and based on a determination reference value obtained from the gloss determination table.

In such a device, it is preferred that the unit image be one pixel in the image.

According to such a configuration, using image data representing a print, image, a determination as to whether gloss quality is good or not is made for each pixel in the print image, based on a determination reference value obtained from the gloss determination table. Accordingly, gloss quality can be accurately verified irrespective of the shapes or sizes of areas of various types of images included in a print image.

A yet another aspect of the present invention is directed to a computer-readable recording medium having recorded therein a gloss determination program for causing a computer for determining whether gloss quality of printed matter obtained by performing printing using photocurable inks of color K and N colors other than the color K (N is an integer greater than or equal to 3) is good or not, to perform:

a dispersion calculation step of calculating, for each predetermined unit image in an image to be printed, dispersion of amounts of components of the N colors in the unit image, based on image data representing the image;

a determination reference value obtaining step of obtaining, using a gloss determination table that provides a determination reference value of the gloss quality to a combination of an amount of a K color component and dispersion of amounts of components of the N colors, a determination reference value corresponding to a combination of an amount of a K color component included in each unit image in the image and dispersion calculated in the dispersion calculation step for the unit image, from the gloss determination table;

a total-amount-of-color-components calculation step of calculating, as a total amount of color components, a sum total of amounts of components of the color K and the N colors from the image data, the color K and the N colors being included in each unit image in the image; and a determination step of determining, for each unit image in the image, whether gloss quality of the printed matter is good or not by comparing the total amount of color components in the unit image with a determination reference value obtained, for the unit image, in the determination reference value obtaining step.

These and other objects, features, modes, and effects of the present invention will become more apparent from the following detailed description of the present invention by referring to the accompanying drawings.

BRIEF DESCRIPTION OF THE DRAWINGS

FIG. 4 is a diagram for describing an operation procedure in the printing system that uses the gloss determination device according to the first embodiment.

FIG. 5 is a flowchart for describing a gloss quality preview process in the first embodiment.

FIG. 7 is a diagram for describing a relationship between an appropriate amount of ink for producing printed matter with good gloss quality and the type of base material, speed mode, and a combination of colors, in the printing system.

FIG. 8 is a diagram showing an example of a determination table A used in the first embodiment.

FIG. 9 is a diagram showing an example of a determination table B used in the first embodiment.

FIG. 10 is a diagram showing an example of a determination table C used in the first embodiment.

FIG. 11 is a diagram for describing the creation of a gloss determination table used in the first embodiment.

FIGS. 12A and 12B are diagrams for describing a conventional color conversion process for generating print data from submitted data, depending on an ICC profile.

FIGS. 13A and 13B are diagrams for describing a color conversion process for generating print data from submitted data, depending on an ICC profile so as to suppress the occurrence of poor gloss in printed matter.

FIG. 16 is a diagram showing an example of setting of limit values of the amount of ink for suppressing the occurrence of poor gloss in printed matter.

FIG. 17 is a diagram for describing the setting of a limit value for each color in the method for limiting the amount of ink discharged.

FIG. 18 is a diagram for describing the setting of a limit value for each color in the method for limiting the amount of ink discharged.

FIG. 21 is a diagram for describing a relationship between appropriate amounts of ink for producing printed matter with good gloss quality and the type of base material, speed mode, and a combination of colors, in the printing system that uses the gloss determination device according to the second embodiment FIG. 22 is a diagram for describing the creation of an extended gloss determination table used in the second embodiment.

DESCRIPTION OF PREFERRED
EMBODIMENTS

0. Conventional UV Printing System

Figure 24:
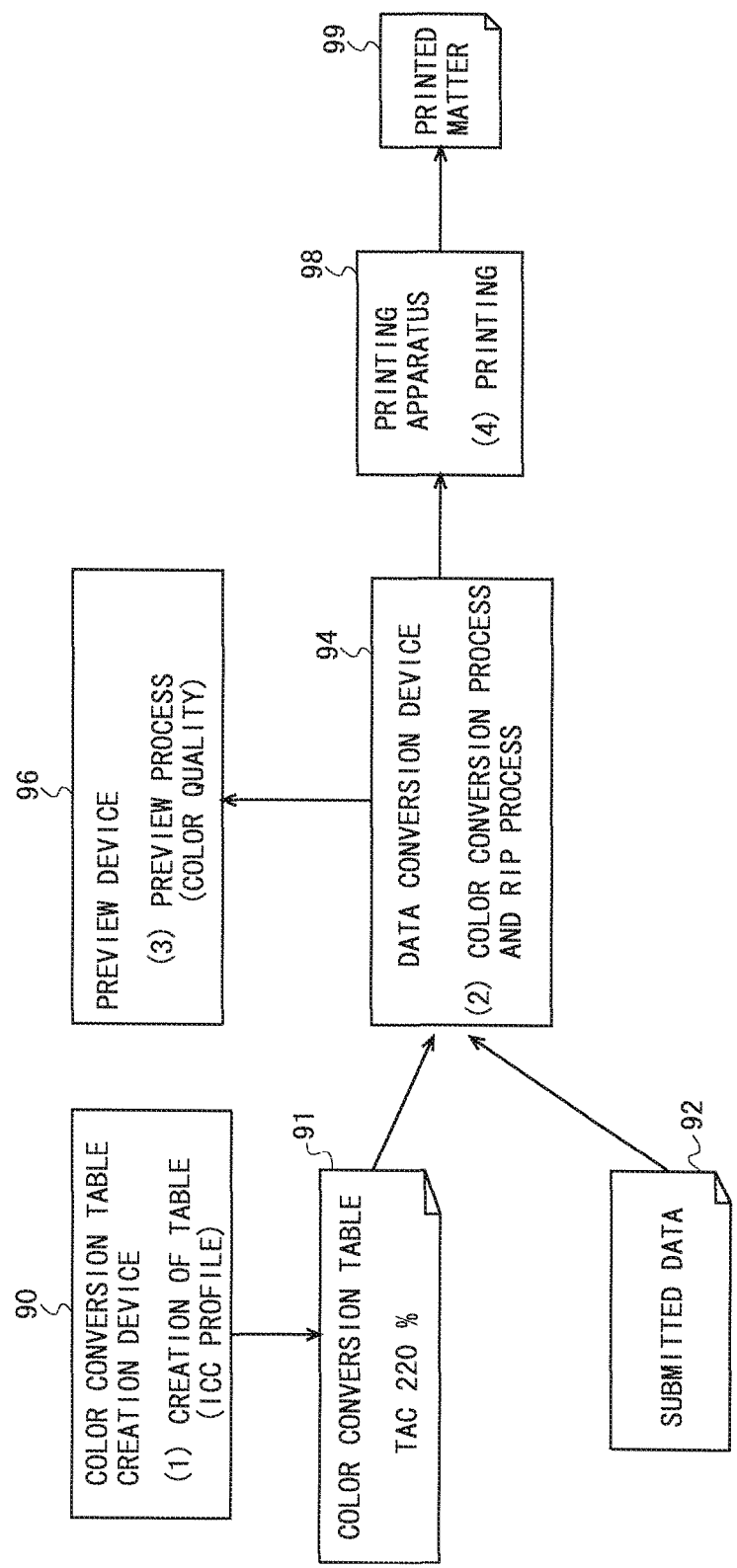
FIG. 24 is a diagram for describing an operation procedure in a conventional printing system.

In a conventional UV printing system, as shown in FIG. 24, page data where a print target is described in a page description language (e.g., data in Portable Document Format (PDF)) is generated in advance as submitted data 92, and a color conversion table 91 depending on an ICC profile for managing print colors is created in advance by a color conversion table creation device 90. The color conversion table 91 is created so as to satisfy a limit of a TAC value (e.g., 220%) set in the ICC profile in order not only to satisfy color reproducibility, but also to prevent a reduction in gloss due to ink curing failure.

Then, a printing data conversion device 94 performs a color conversion process and a rasterizing process (also called "RIP process") on the submitted data 92 serving as the page data, and thereby generates print data serving as data in bitmap format. Before performing printing using the print data, a preview device 96 performs preview display of an image representing printed matter, i.e., an image represented by the print data (hereinafter, referred to as "print image"). An operator views the preview display to verify whether appearance of colors is appropriate, i.e., whether color quality is good or not. Then, after verifying that the appearance of colors is appropriate, the print data is sent to a printing apparatus 98 and printing is performed.

In a UV printing system such as that described above, the color quality of printed matter can be verified in advance by display of a print image on the preview device. However, gloss quality, such as whether the finish of printed matter does not have a matte look, is determined by the operator viewing the actual printed matter. As a result, when it is determined that the gloss quality is not good, a color conversion table 91 depending on an ICC profile whose TAC value is reduced to eliminate ink curing failure is created, and using the color conversion table 91 operations are redone from a color conversion process and a RIP process for the submitted data.

In this case, the TAC value indicating the total amount of ink is reduced to increase gloss quality, but when the amount of ink is reduced, color quality tends to be degraded. That is, in UV printing, color quality and gloss quality are in a contradictory relationship. Hence, repetition of processes including the creation of a color conversion table depending on an ICC profile where a TAC value is set→a color conversion process and a RIP process→(preview)→printing may take place until a balance between color quality and gloss quality is achieved. When such repetition of processes takes place, operation efficiency decreases, causing an increase in cost. Hence, implementation of a method for effectively obtaining printed matter that achieves a balance between color quality and gloss quality is sought.

Embodiments of the present invention will be described below with reference to the accompanying drawings.

1. First Embodiment

<1.1 Overall Configuration of a Printing System>

Figure 1:
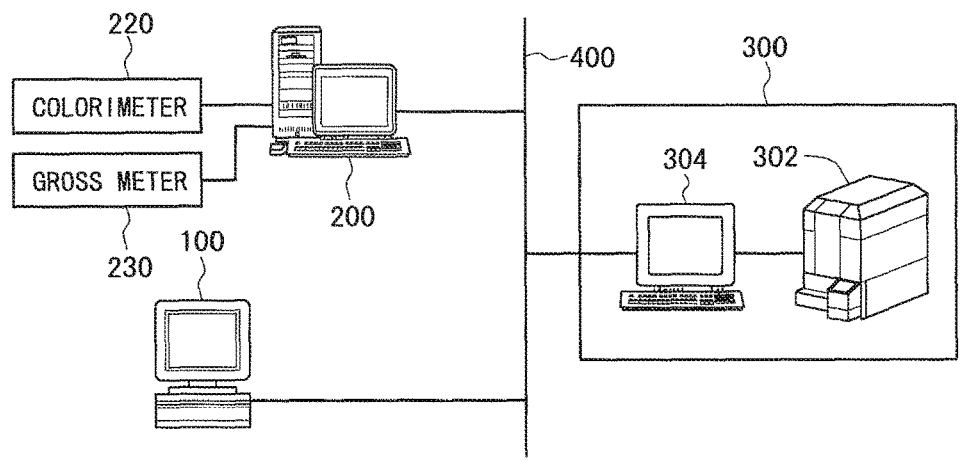
FIG. 1 is an overall configuration diagram of a printing system that uses a gloss determination device according to a first embodiment of the present invention.

FIG. 1 is an overall configuration diagram of a printing system including an image processing apparatus 200 that functions as a gloss determination device according to a first embodiment of the present invention. The printing system includes a client computer 100 for editing and laying out a plurality of types of components such as characters, logos, patterns, and illustrations that form printed matter; the image processing apparatus 200 that performs various types of processes such as a process of creating, for example, a color conversion table depending on an ICC profile for managing print colors, a RIP process of converting submitted data into raster data, a color conversion process of converting color data using the color conversion table created depending on the ICC profile, and a preview process for verifying beforehand the color quality and gloss quality of the printed matter;

a colorimeter 220 and a gloss meter 230 that are connected to the image processing apparatus 200; and an inkjet printing apparatus 300 that performs color printing. The inkjet printing apparatus 300 includes a printer main body 302 and a print control device 304 which is a control device for the printer main body 302. The client computer 100, the image processing apparatus 200, and the inkjet printing apparatus 300 are connected to each other by a LAN 400 so as to be communicable with each other. Note that the inkjet printing apparatus 300 in the present embodiment is a photocurable (ultraviolet-curable) inkjet printing apparatus.

Printing by this printing system is schematically performed as follows. First, in the client computer 100, editing and layout of various types of components such as those described above are performed, and thereby, for example, page data where a print target is described in a page description language is generated. The page data generated in the client computer 100 is provided as submitted data to the image processing apparatus 200. The image processing apparatus 200 performs a RIP process (rasterizing process) and a color conversion process on the submitted data, and thereby generates print data in bitmap format. Note that the RIP process is performed either before or after the color conversion process. The print data generated in the image processing apparatus 200 is sent to the inkjet printing apparatus 300. The inkjet printing apparatus 300 performs printing based on the print data.

Note that in the image processing apparatus 200, a color conversion table depending on an ICC profile is created in advance so that print data based on submitted data, can be generated. The ICC profile is created based on the results of colorimetry of a color chart printed by a printing apparatus concerned. The colorimetry of the color chart is performed by the colorimeter 220. For creation of an ICC profile, publicly known techniques can be adopted. Creation of a color conversion table depending on the ICC profile will be described later.

<1.2 Configuration of the Inkjet Printing Apparatus>

Figure 2:
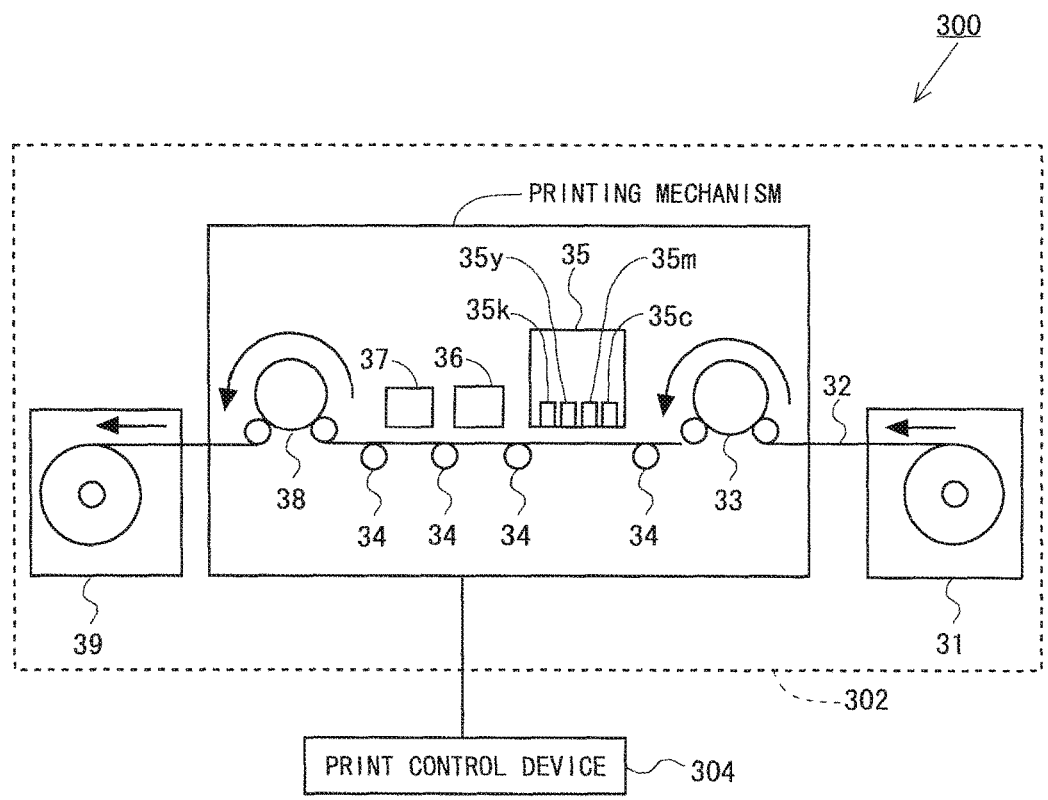
FIG. 2 is a schematic diagram showing one exemplary configuration of an inkjet printing apparatus in the printing system.

FIG. 2 is a schematic diagram showing one exemplary configuration of the inkjet printing apparatus 300 in the printing system that uses the gloss determination device according to the present embodiment. As described above, the inkjet printing apparatus 300 includes the printer main body 302 and the print control device 304 which is a control device for the printer main body 302. The printer main body 302 includes a paper sending unit 31 that supplies printing paper 32 which is a base material; a first drive roller 33 for transporting the printing paper 32 into a printing mechanism; a plurality of support rollers 34 for transporting the printing paper 32 within the printing mechanism; a print unit 35 that performs printing by discharging inks onto the printing paper 32; a UV irradiation unit 36 that allows the inks on the printed printing paper 32 to be cured; an inspection unit 37 that inspects the state of the print on the printing paper 32; a second drive roller 38 for outputting the printing paper 32 from within the printing mechanism; and a paper roll-up unit 39 that rolls up the printed printing paper 32. The print unit 35 includes a C inkjet head 35$c$, an M inkjet head 35$m$, a Y inkjet head 35$y$, and a K inkjet head 35$k$ that discharge cyan (C), magenta (M), yellow (Y), and black (K) inks, respectively. Note that the printing mechanism also includes therein ink tanks (not shown) that store inks to be supplied to the inkjet heads 35$c$, 35$m$, 35$y$, and 35$k$.

The print control device 304 controls the operation of the printer main body 302 configured in the above-described manner. When a printout instruction command is provided to the print control device 304, the print control device 304 controls the operation of the printer main body 302 such that the printing paper 32 is transported from the paper sending unit 31 to the paper roll-up unit 39. Then, during the course of transportation of the printing paper 32, first, print by discharge of inks from the inkjet heads 35$c$, 35$m$, 35$y$, and 35$k$ in the print unit 35 is performed, and then, the inks are cured by the UV irradiation unit 36, and finally, the state of printing is inspected by the inspection unit 37.

<1.3 Configuration of the Image Processing Apparatus>

Figure 3:
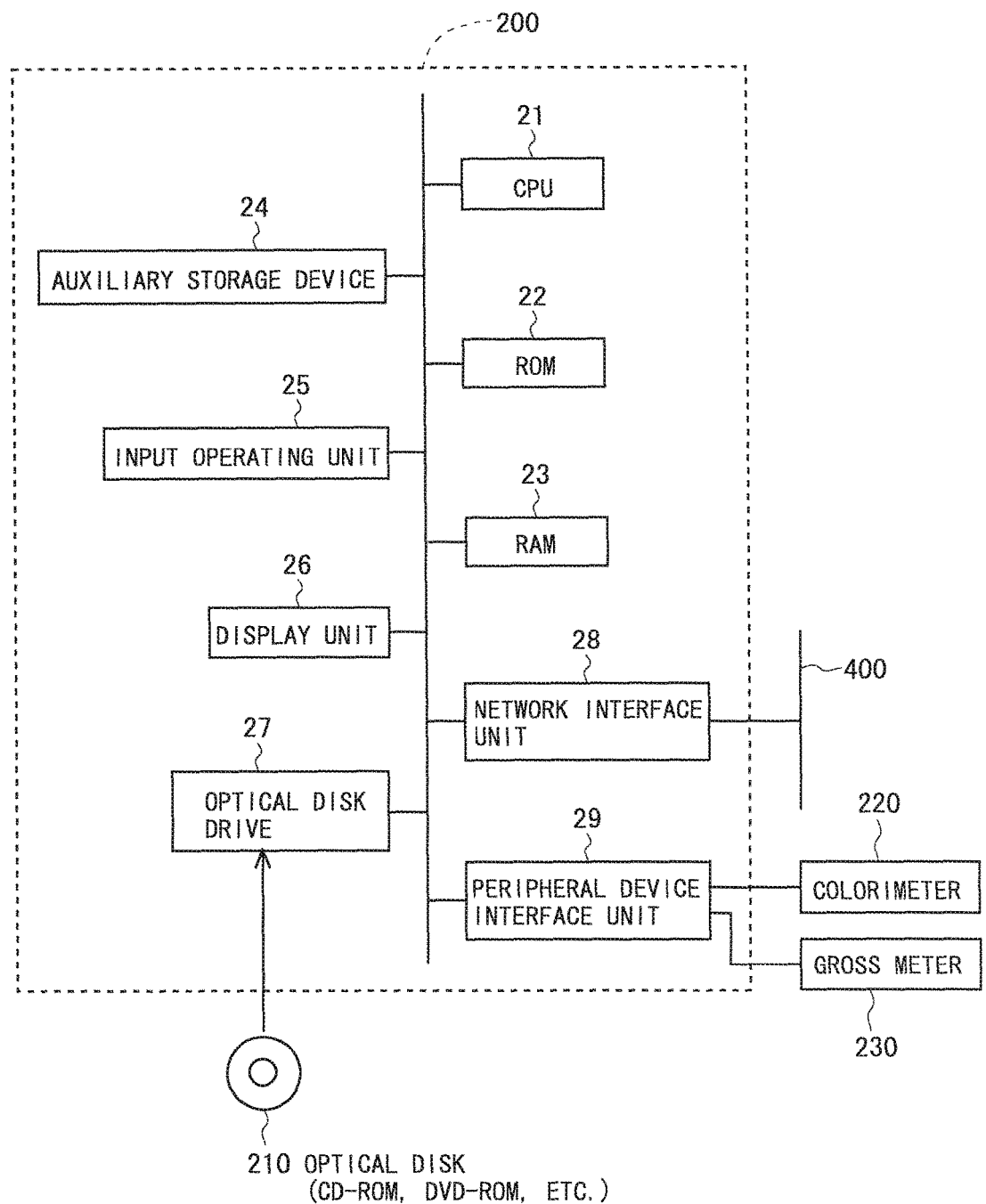
FIG. 3 is a hardware configuration diagram of an image processing apparatus that functions as the gloss determination device according to the first embodiment.

FIG. 3 is a hardware configuration diagram of the image processing apparatus 200 in the present embodiment. The image processing apparatus 200 is implemented by a personal computer, and includes a CPU 21, a ROM 22, a RAM 23, an auxiliary storage device 24, an input operation unit 25 such as a keyboard, a display unit 26, an optical disk drive 27, a network interface unit 28, and a peripheral device interface unit 29. The colorimeter 220 and the gloss meter 230 are connected to the peripheral device interface unit 29. Submitted data that is sent from the client computer 100 via the LAN 400 is inputted into the image processing apparatus 200 through the network interface unit 28. Print data generated in the image processing apparatus 200 is sent to the inkjet printing apparatus 300 via the LAN 400 through the network interface unit 28.

The image processing apparatus 200 functions as a printing data conversion device that performs a color conversion process depending on an ICC profile and a rasterizing process on submitted data to generate print data, by the CPU 21 loading a predetermined program installed on the auxiliary storage device 24 to the RAM 23 and executing the program. In addition, the image processing apparatus 200 also functions as a color conversion table creation device that creates a color conversion table depending on an ICC profile which is used to manage print colors in the printing system, by the CPU 21 loading a color conversion table creation program installed on the auxiliary storage device 24 to the RAM 23 and executing the program. Furthermore, the image processing apparatus 200 also functions as a preview device that performs preview display for verifying beforehand (before printing) whether the color quality and gloss quality of printed matter are good or not, by the CPU 21 loading a preview processing program installed on the auxiliary storage device 24 to the RAM 23 and executing the program. The preview device has the function as a gloss determination device in addition to the function as a conventional color quality determination device. Note that the above-described various types of programs are provided in a state in which the programs are stored in a computer-readable recording medium (non-transitory recording medium) such as a CD-ROM or a DVD-ROM. That is, a user purchases an optical disk (a CD-ROM, a DVD-ROM, etc.) 210 having stored therein the programs and inserts the optical disk 210 into the optical disk drive 27 to read the programs from the optical disk 210 and install the programs on the auxiliary storage device 24. Alternatively, instead of this, the programs sent through the LAN 400, etc., may be received by the network interface unit 28 and installed on the auxiliary storage device 24.

Note that the client computer 100 is also implemented by a personal computer, as with the image processing apparatus 200. Thus, a description of a configuration of the client computer 100 is omitted.

<1.4 Operation Procedure in the Printing System>

FIG. 4 is a diagram for describing an operation procedure in the already described printing system shown in FIG. 1. In this printing system, page data where a print target is described in a page description language is generated in the client computer 100, and the page data is provided as submitted data 12 to the image processing apparatus 200. As already described, by the CPU 21 included in the image processing apparatus 200 executing the above-described various types of programs, the image processing apparatus 200 functions as a color conversion table creation device 10, a printing data conversion device (hereinafter, also simply referred to as "data conversion device") 14, and a preview device 16. That is, the color conversion table creation device 10, the data conversion device 14, and the preview device 16 shown in FIG. 4 are implemented software-wise by the above-described various types of programs. Note that a computer that executes the above-described various types of programs is not limited to the image processing apparatus 200, and other computers, e.g., a computer serving as the print control device 304 may execute some or all of the above-described various types of programs.

A color conversion table depending on an ICC profile where a predetermined TAC value is set to prevent a reduction in the gloss in printed matter is created by the color conversion table creation device 10, for a color conversion process for the submitted data 12. Here, it is assumed that a color conversion table depending on an ICC profile with a TAC value of 220% (hereinafter, also referred to as "color conversion table with a TAC value limit of 220%") 11a is created. The color conversion table 11a is provided to the data conversion device 14 together with the submitted data 12.

The data conversion device 14 converts the submitted data 12 into CMYK data by a color conversion process performed based on the color conversion table 11a with a TAC value limit of 220%. When printing is performed using this CMYK data, the amount of ink is limited such that the TAC value is 220% or less (such that the total value of the amount of inks of four colors, C, M, Y, and K, is 220% or less). Then, the data conversion device 14 performs a rasterizing process on the CMYK data and thereby generates print data Dpr in bitmap format. Note that print data Dpr may be generated by performing a rasterizing process on the submitted data 12 and then performing a color conversion process based on the color conversion table 11a.

The print data Dpr generated by the data conversion device 14 is provided to the preview device 16 before sent to a printing apparatus 18. FIG. 5 is a flowchart showing a procedure of a gloss quality preview process for verifying the gloss quality of printed matter before performing printing using the print data Dpr. The gloss quality preview process will be described below with reference to FIG. 5.

To determine the gloss quality of printed matter, the above-described print data Dpr which is CMYK data in bitmap format is used. The print data Dpr is generated by the data conversion device 14 performing a data conversion process (a color conversion process and a RIP process) at step S110 in the flowchart of FIG. 5.

Thereafter, using the print data Dpr, a gloss determination process S120 is performed by the preview device 16. At this time, the image processing apparatus 200 functioning as the preview device 16 functions as a gloss determination device (FIGS. 1 and 3). The image processing apparatus 200 includes in advance a plurality of gloss determination tables Tb1, Tb2, . . . depending on the types of base material that can be used for printing and speed mode. In the gloss determination process S120, a gloss determination table Tbs depending on the type of base material and speed mode which are included in printing conditions specified by an operator's input operation or in printing conditions set in advance is selected from among the plurality of gloss determination tables Tb1, Tb2, . . . Using the selected gloss determination table Tbs, a determination as to whether the gloss quality of printed matter to be produced based on the print data Dpr is good or not (a glossy look or a matte look) is made for each pixel in a print image represented by the print data Dpr. Then, gloss determination result data representing the results of the determination is generated. A detail of such a gloss determination process S120 will be described later.

Figure 6A:
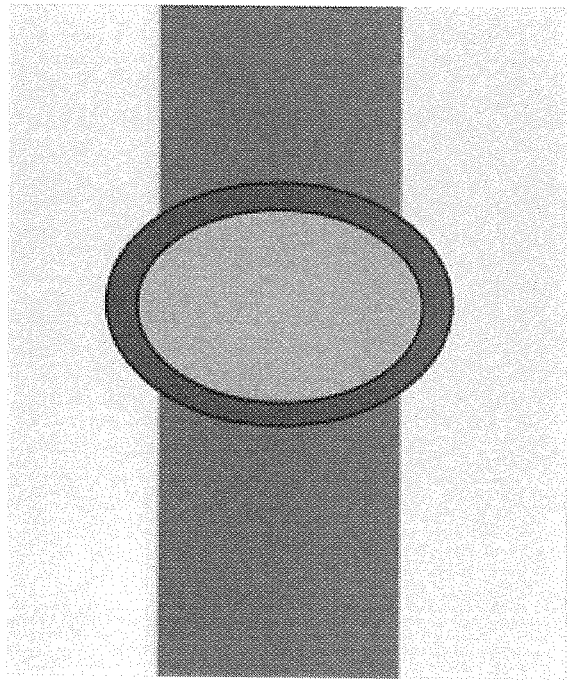
FIGS. 6A and 6B are diagrams for describing preview display in the gloss quality preview process in the first embodiment.
Figure 6B:
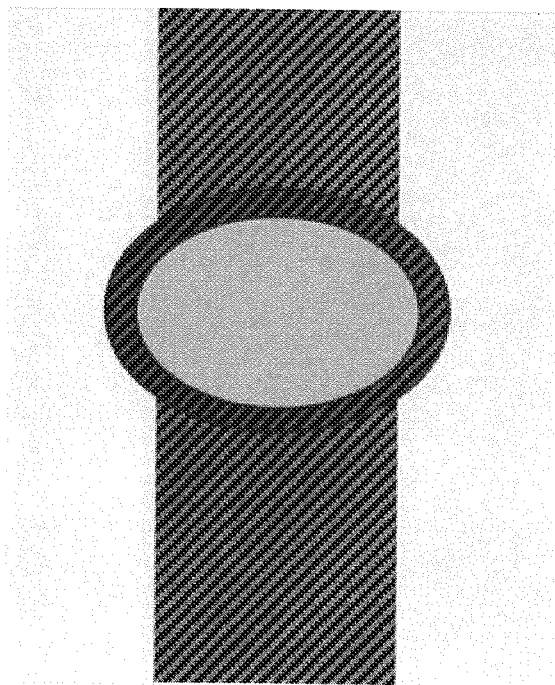

When the gloss determination process S120 is done, the preview device 16 performs a preview process S130 based on the gloss determination result data. Specifically, based on the print data Dpr and the gloss determination result data, a print image is displayed on the image processing apparatus 200 functioning as the preview device 16, in a mode that allows the operator to verify the color quality and gloss quality of printed matter (hereinafter, the image displayed in this manner is referred to as "preview image"). For example, in a case in which a print image representing printed matter is an image such as that shown in FIG. 6A, when it is determined that the gloss quality of each pixel included in a ring-shaped area at a central portion of the print image and in upper and lower rectangular areas being in contact with the ring-shaped area is not good (matte look), for example, as shown in FIG. 6B, image areas including the pixels determined to have a matte look (hereinafter, referred to as "poor glossy areas") are hatched, and the hatched print image is displayed as a preview image. Note, however, that a method for showing gloss determination results is not limited to such a method using hatching, and any method may be adopted as long as a print image can be displayed by a method that allows the operator to easily determine a poor glossy area in a preview image. For example, instead of or together with the method using hatching, an image area including pixels that are determined to have a matte look may be displayed in a specific color (e.g., red), or, for example, the area may be displayed flashing. Note that although FIGS. 6A and 6B show a monochrome halftone image, the actual preview device 16 (image processing apparatus 200) displays a color halftone image.

By viewing the preview image (FIG. 6B) displayed on the image processing apparatus 200 serving as the preview device 16, the operator can verify the gloss quality of printed matter in addition to color quality without performing printing based on the print data Dpr. In general, in printing using photocurable ink, the amount of ink needs to be reduced to increase the gloss quality of printed matter, but if the amount of ink is reduced, color quality decreases. That is, regarding the amount of ink, gloss quality and color quality are in a contradictory relationship. Hence, when the operator having viewed the preview image determines that the gloss quality is not good, for example, a color conversion table with a TAC value limit that is slightly lower than the TAC value limit (220%) in the color conversion table 11a used at the present time is newly created, and print data (CMYK data in bitmap format) Dpr is regenerated using the new color conversion table. Using the new print data Dpr, a data conversion process S110 of FIG. 5 is performed, and then a gloss determination process S120 and a preview process S130 are performed in turn. The operator views a preview image obtained by the preview process S130, to verify beforehand the color quality and gloss quality of printed matter.

As a result, when the operator determines that both color quality and gloss quality are good (a balance between color quality and gloss quality is achieved), the new print data Dpr is sent to the printing apparatus 18. The inkjet printing apparatus 300 serving as the printing apparatus 18 performs printing using the print data Dpr sent from the image processing apparatus 200. On the other hand, when the operator having viewed the preview image created based on the new print data Dpr determines that either color quality or gloss quality is not good, a color conversion table is recreated depending on the result of the determination, and a data conversion process S110→a gloss determination process S120→a preview process S130 are repeated until both color quality and gloss quality are in good condition.

Alternatively, instead of an operation procedure such as that described above, when the operator determines that gloss quality is not good at the first display of a preview image, a gloss-priority color conversion table 11b which will be described later may be used instead of a conventional color conversion table such as the color conversion table 11a. The gloss-priority color conversion table 11b is configured such that, instead of uniformly limiting the amount of ink by a TAO value, the amount of a K color component and the amount of color components generating a gray component are limited to a relatively small value. By preparing such a gloss-priority color conversion table 11b, repetition of operations of the above-described data conversion process S110→gloss determination process S120→preview process S130 can be suppressed. A detail of the gloss-priority color conversion table 11b will be described later. Note that the "amount of a color component" refers to the grayscale value of any of the CMYK color components. For example, the amount of a K color component refers to the grayscale value of the K color component.

<1.5 Gloss Determination Table>

Next, a gloss determination table used in the gloss determination process S120 in the present embodiment will be described.

As already described, in printing using photocurable ink such as UV printing, when ink curing failure occurs, a surface of printed matter becomes nonuniform and accordingly the finish of the printed matter has a matte look. Whether ink curing failure occurs in UV printing, etc., depends on printing conditions such as the type of base material and speed mode. In addition, whether ink curing failure occurs also depends on a combination of colors. Even with the same TAC value, when a K color component increases or when a gray component increases by mixing of CMY colors, ink curing failure is likely to occur. Therefore, it can be considered that the limit value of the amount of ink for allowing the finish of printed matter to have a glossy look (good gloss quality) without causing ink curing failure is determined by the combination of the type of base material, the speed mode, and ink colors. Here, the limit value of the amount of ink refers to an amount at which the finish of printed matter has a glossy look when a TAC value indicating the total amount of ink is set to be less than or equal to the limit value. Since the color quality improves as the amount of ink increases, in the following the limit value of the amount of ink is also referred to as "appropriate amount of ink".

For example, the gloss level of printed matter which is produced by the inkjet printing apparatus 300 is measured by the gloss meter 230 (e.g., 60-degree measurement), and the total amount of ink for when a gloss level of 50% is obtained as the measured value can be set as an appropriate amount of ink. In FIG. 7, an appropriate amount of ink determined by such a method is represented by a TAC value. According to FIG. 7, for example, when the base material is a white film and the speed mode is standard (high speed), the appropriate amount of ink (TAC value) for printing with a secondary color (each of the amounts of color components of two colors out of CMY is 100%) is 200%. In addition, for example, when the base material is a white film and the speed mode is standard (high speed), the appropriate amount of ink (TAC value) for printing with a tertiary color (each of the amounts of color components of three CMY colors is 100%) is 160%. In addition, for example, when the base material is a white film and the speed mode is standard (high speed), the appropriate amount of ink (TAC value) for printing with a color including a K color component (the amount of a K color component is 100%) is 120%.

In the present embodiment, it is considered that when printing conditions (the type of base material and speed mode) have been determined, appropriate amounts of ink such as those described above are uniquely determined by the amount of a K color component corresponding to the amount of a K color ink, and a balance between the amounts of CMY color components (a value corresponding to the amount of a gray component). Note, however, that for convenience of arithmetic processing, a standard deviation corresponding to dispersion indicating the degree of variation is used instead of the balance between the amounts of CMY color components. Hence, in the present embodiment, a gloss determination table is created such that a combination of the amount of a K color component and the dispersion of the amounts of color components in CMY is provided with an appropriate amount of ink corresponding to the combination, as a determination reference value, and a plurality of gloss determination tables are prepared depending on combinations of the type of base material and speed mode (printing conditions). That is, such a plurality of gloss determination tables are created in advance and stored in the auxiliary storage device 24 in the image processing apparatus 200. Note that in the following a description is made assuming that the base material is a white film and the speed mode is standard (high speed) unless otherwise the type of base material and the speed mode are particularly mentioned.

In the following description, the terms "tertiary color", "secondary color", and "primary color" for the colors of printed matter or a print image are used to have the following meanings (the same also applies to a description of another embodiment). The "tertiary color" refers to a tertiary color not including a K color component, i.e., a color composed of a C color component, an M color component, and a Y color component. The "secondary color" refers to a secondary color not including a K color component, i.e., a color composed of a C color component and an M color component, a color composed of an M color component and a Y color component, and a color composed of a Y color component and a C color component. The "primary color" refers to a primary color not including a K color component, i.e., a color composed of only a C color component, a color composed of only an M color component, and a color composed of only a Y color component.

Even with the same combination of the amount of a K color component and the standard deviation of the amounts of color components in three CMY colors (a standard deviation calculated from the amount of a C color component, the amount of an M color component, and the amount of a Y color component), the already described appropriate amount of ink shown in FIG. 7 is not normally the same between the case of a tertiary color where the amounts of all CMY color components are non-zero, the case of a secondary color where the amounts of any two of the CMY color components are non-zero, and the case of a primary color where only the amount of any one of the CMY color components is non-zero. Hence, in the present embodiment, the above-described gloss determination table includes a determination table A serving as a third determination table that associates a determination reference value with a combination of the amount of a K color component (0 to 100%) and the standard deviation of the amounts of color components in a tertiary color; a determination table B serving as a second determination table that associates a determination reference value with a combinations of the amount of a K color component (0 to 100%) and the standard deviation of the amounts of color components in a secondary color; and a determination table C serving as a first determination table that associates a determination reference value with a combination of the amount of a K color component (0 to 100%) and the amount of a color component composing a primary color. FIGS. 8, 9, and 10 show examples of such determination tables A, B, and C, respectively.

Note that according to a data conversion process (a color conversion process and a RIP process) using a gloss-priority color conversion table 11*b* which will be described later, the TAC value for each pixel in a print image is less than or equal to a determination reference value which is provided by the determination tables A, B, and C. The gloss-priority color conversion table 11*b* is based on a method for limiting the amount of ink discharged which will be described later. Hence, the determination table A can be created by determining a limit value of the amount of ink discharged based on the method for limiting the amount of ink discharged which will be described later, while changing the amount of a K color component in a range of 0 to 100% and changing, with the amounts of any two color components of a tertiary color being set to 100%, the amount of the other one color component in a range of 0 to 100%, as shown in FIG. 11, and then setting a TAC value corresponding to the limit value at a corresponding location of the determination table A, as determination reference value. Likewise, the determination tables B and C can also be created by determining a limit value of the amount of ink discharged based on the method for limiting the amount of ink discharged which will be described later. Note that although in FIG. 11, upon creation of the determination table A, the amount of a K color component and the amount of the other one color component are changed at 10% intervals, in practice they are changed at smaller intervals (e.g., 1% intervals). This also applies to the creation of the determination tables B and C.

<1.6 Color Conversion Table>

First, with reference to FIGS. 12A and 12B, a conventional color conversion process will be described where print data is generated from submitted data, depending on an ICC profile for managing print colors. Note that here a case in which the submitted data is RGB data will be described as an example. Note also that it is assumed that the CIELab color space is used as a profile connection space (PCS). Furthermore, although the generation of print data from submitted data requires a RIP process (rasterizing process) in addition to a color conversion process, in the following a description of the RIP process is omitted for convenience of description. These also apply to a color conversion process (described later) shown in. FIGS. 13A and 13B.

The image processing apparatus 200 serving as the color conversion table creation device 10 is provided with an input ICC profile 61 corresponding to an input device; and an output ICC profile 62*a* corresponding to an output device (here, the inkjet printing apparatus 300 serving as the printing apparatus 18). For example, the image processing apparatus 200 stores, in the auxiliary storage device 24, the input ICC profile 61 and the output ICC profile 62*a* as tables for a color conversion process, and loads the tables into the RAM 23 when performing a color conversion process (see FIG. 3). Here, it is assumed that, as a TAC value indicating a limit of the amount of ink, 220% is set in the output ICC profile 62*a*.

As shown in FIG. 12A, when RGB data 51 is provided as submitted data 12, first, the RGB data 51 is converted into Lab data 52 using the input ICC profile 61. That is, for each color data, conversion from an RGB value to a Lab value is performed. Then, the Lab data 52 is converted into CMYK data 54*a* serving as print data Dpr, using the output ICC profile 62*a*. That is, for each color data, conversion from a Lab value to a CMYK value is performed. The color conversion process shown in FIG. 12A uses the output ICC profile 62*a* where the TAC value is set to 220%. Therefore, the CMYK values in the CMYK data 54*a* are values that are limited uniformly (irrespective of combinations of colors) such that the amount of ink is 220% or less in TAC value.

Although the color conversion process shown in FIG. 12A uses the input ICC profile 61 and the output ICC profile 62*a*, a color conversion table 11*a* into which the input ICC profile and the output ICC profile 62*a* are merged may be used as shown in FIG. 12B. The color conversion table 11*a* is the color conversion table 11*a* used in the operation procedure shown in FIG. 4. In the color conversion table 11*a*, 220% is set as a TAC value for limiting the amount of ink. In the operation procedure of FIG. 4, RGB data 51 serving as submitted data 12 is converted into CMYK data 54*a* serving as print data Dpr by the color conversion table 11*a*.

Next, with reference to FIGS. 13A and 13B, a color conversion process will be described where print data is generated from submitted data, depending on an ICC profile so as to suppress the occurrence of poor gloss in printed matter, i.e., to give priority to gloss.

The image processing apparatus 200 serving as the color conversion table creation device 10 is provided with an input ICC profile 61 corresponding to an input device; an output ICC profile 62 corresponding to an output device (here, the inkjet printing apparatus 300 serving as the printing apparatus 18); and an amount-of-ink limitation color conversion table 63 which is used to convert color data so as to inhibit ink curing failure and which is created using a method for limiting the amount of ink discharged (described later). For example, the image processing apparatus 200 stores, in the auxiliary storage device 24, the input ICC profile 61, the output ICC profile 62, and the amount-of-ink limitation color conversion table 63, as tables for a color conversion process, and loads the tables into the RAM 23 when performing a color conversion process (see FIG. 3). Note that in the output ICC profile 62 400% is set as a TAC value.

As shown in FIG. 13A, when RGB data 51 is provided as submitted data 12, first, the RGB data 51 is converted into Lab data 52 using the input ICC profile 61. That is, for each color data, conversion from an RGB value to a Lab value is performed. Then, the Lab data 52 is converted into CMYK data 53 using the output ICC profile 62. That is, for each color data, conversion from a Lab value to a CMYK value is performed. As already described, 400% is set in the output ICC profile 62 as a TAC value. Therefore, the CMYK values in the CMYK data 53 are values that do not take into account at all a limit of the amount of ink.

Thereafter, the CMYK data 53 is converted into CMYK data 54*b* serving as print data Dpr, using the amount-of-ink limitation color conversion table 63. The CMYK values in the CMYK data 54*b* are values that take into account a limit of the amount of ink. That is, for each color data, CMYK values to be provided to the inkjet printing apparatus 300 are determined so as not to cause ink curing failure. The CMYK data 54b generated in the above-described manner is sent to the printing apparatus 18 (inkjet printing apparatus 300) as print data Dpr, and the printing apparatus 18 produces printed matter 19.

Although the color conversion process shown in FIG. 13A uses the input ICC profile 61, the output ICC profile 62, and the amount-of-ink limitation color conversion table 63, a color conversion table 11b into which the input ICC profile 61, the output ICC profile 62, and the amount-of-ink limitation color conversion table 63 are merged may be used as shown in FIG. 13B. The color conversion table 11b is the gloss-priority color conversion table 11b used in the operation procedure shown in FIG. 4. Since the amount-of-ink limitation color conversion table 63 is created using a method for limiting the amount of ink discharged (described later) so as to suppress ink curing failure, the CMYK values in the CMYK data 54b which is obtained by a color conversion process using the gloss-priority color conversion table 11b are values that accommodate a limit of the amount of ink for suppressing ink curing failure. In the operation procedure of FIG. 4, when print data Dpr is generated using the conventional color conversion table 11a in which 220% is set as a TAC value, and an operator having viewed a preview image created based on the print data Dpr determines that gloss quality is not good, print data Dpr is regenerated using the gloss-priority color conversion table 11b, and printed matter with good gloss quality (glossy look) can be produced by using the print data Dpr.

<1.7 Method for Limiting the Amount of Ink Discharged>

As shown in FIGS. 13A and 13B, the above-described gloss-priority color conversion table 11b is created based on the amount-of-ink limitation color conversion table 63 in addition to the input ICC profile 61 and the output ICC profile 62, and the amount-of-ink limitation color conversion table 63 is created using a method for limiting the amount of ink discharged which will be described later. The method for limiting the amount of ink discharged will be described below. The method for limiting the amount of ink discharged is a method for limiting the amounts of four color inks discharged, so as not to cause ink curing failure when the inkjet printing apparatus 300 performs printing. The above-described gloss-priority color conversion table 11b is created by the image processing apparatus 200 serving as the color conversion table creation device 10, based on the amount-of-ink limitation color conversion table 63. At that time, various types of setting information of the inkjet printing apparatus 300 side are provided to the image processing apparatus 200.

Figure 14:
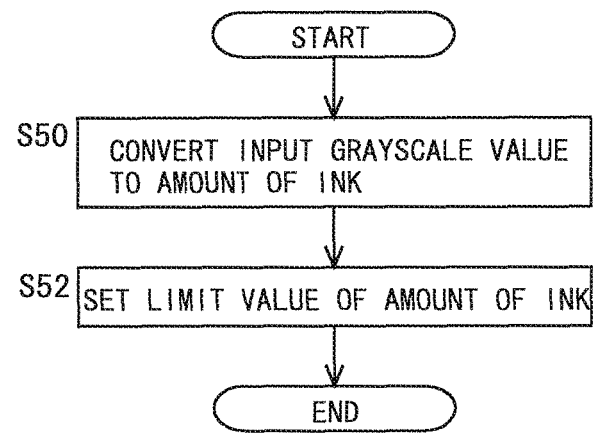
FIG. 14 is a flowchart showing a procedure of a method for limiting the amount of ink discharged, for suppressing the occurrence of poor gloss in printed matter.

FIG. 14 is a flowchart showing a procedure of the method for limiting the amount of ink discharged. First, for each color represented by CMYK values, a process of converting input grayscale values (values corresponding to CMYK values in the CMYK data 53 in FIG. 13A) to the amounts of ink is performed for each ink color (step S50). More specifically, for any color represented by (C value, M value, Y value, K value)=(Zc, Zm, Zy, Zk), Zc is converted to the amount of a C color ink, Zm is converted to the amount of an M color ink, Zy is converted to the amount of a Y color ink, and Zk is converted to the amount of a K color ink. Note that Zc, Zm, Zy, and Zk are normally values between 0 and 100, inclusive. The converted amounts of ink are represented by normalized values with the maximum amount of ink used being 100. That is, the converted amounts of ink are also values between 0 and 100, inclusive.

Figure 15:
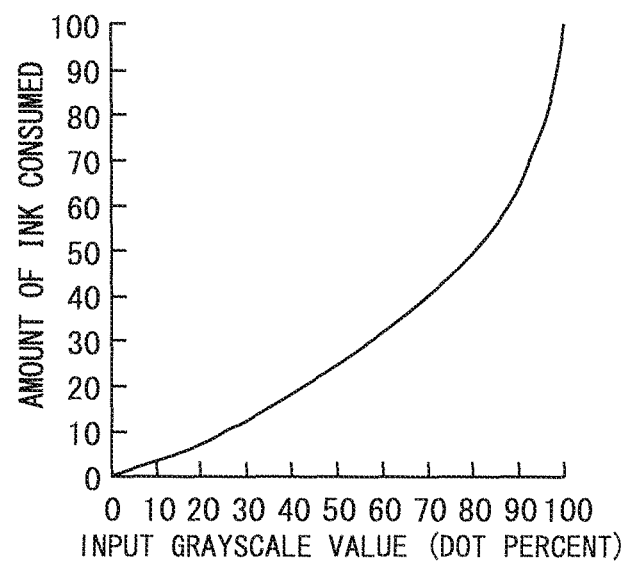
FIG. 15 is a diagram showing a relationship between an input grayscale value and the amount of ink consumed.

Meanwhile, as shown in FIG. 15, the relationship between the input grayscale value and the actual amount of ink consumed (the amount of ink consumed) is not a linear proportional relationship. Normally, the relationship between the input grayscale value and the amount of ink consumed is, as shown in FIG. 15, represented by a downwardly convex curve. Therefore, it is preferred to perform the conversion at step S50, based on the actual amount of ink consumed for each ink color when the inkjet printing apparatus 300 has performed printing in advance. An example of how to determine the actual amount of ink consumed will be described below.

First, the weight of an ink tank (not shown) for each ink color is measured in advance. Then, the inkjet printing apparatus 300 prints a predetermined image (an image in which dot percent is appropriately configured). Thereafter, the weight of the ink tank for each ink color is measured again. Then, a difference (weight difference) between the weight before starting the printing and the weight after completing the printing is determined. By this, the overall amount of ink consumed for each ink color is determined. Meanwhile, a dot size (e.g., S, M, L, etc.) configuration and an average amount of droplets per pixel for any dot percent are known for each inkjet printing apparatus 300. Therefore, when the configuration of a dot percent regarding a printed image is known, the actual amount of ink consumed for each ink color regarding each color can be determined based on information about a dot size configuration and an average amount of droplets for each dot percent and information of a weight difference.

After performing the process of converting input grayscale values to the amounts of ink (step S50 of FIG. 14), a limit value of the amount of ink is set for four CMYK color inks (step S52). Meanwhile, ink curing failure occurs, for example, when absorption of UV light with a wavelength of 300 to 900 nm is performed and ink is not irradiated with a sufficient amount of light. Such a phenomenon is likely to occur when a K color ink is used or when a gray component is generated by mixing of three CMY color inks. Hence, taking into account these facts, a limit value of the amount of ink is set as follows.

In the method for limiting the amount of ink discharged, a limit value is set for each of a secondary color not including a K color component, a tertiary color not including a K color component, and a color including a K color component. That is, three types of limit values are set. The secondary color not including a K color component is specifically any of a color composed of a C color component and an M color component, a color composed of an M color component and a Y color component, and a color composed of a Y color component and a C color component. The tertiary color not including a K color component is specifically a color composed of a C color component, an M color component, and a Y color component. The color including a K color component is specifically any of a color composed of a C color component and a K color component; a color composed of an M color component and a K color component; a color composed of a Y color component and a K color component; a color composed of a C color component, an M color component, and a K color component; a color composed of an M color component, a Y color component, and a K color component; a color composed of a Y color component, a C color component, and a K color component; and a color composed of a C color component, an M color component, a Y color component, and a K color component.

When a limit value for the secondary color not including a K color component is represented by Z1, a limit value for the tertiary color not including a K color component is represented by Z2, and a limit, value for the color including a K color component is represented by Z3, setting is performed such that "Z1>Z2" and "Z1>Z3" are satisfied in the present embodiment. More preferably, setting is performed such that "Z2>Z3" is satisfied.

FIG. 16 is a diagram showing an example of setting of limit values in the present embodiment. In the example shown in FIG. 16, the limit value Z1 for the secondary color not including a K color component is set to 200%, the limit value Z2 for the tertiary color not including a K color component is set to 160%, and the limit value Z3 for the color including a K color component is set to 120%. As such, in the example shown in FIG. 16, setting of limits values of the amounts of ink is performed such that "Z1>Z2", "Z1>Z3", and "Z2>Z3" are satisfied.

Note that in order not to cause ink curing failure even when printing is performed with an amount of ink of 100% regarding a color composed of only a K color component, normally, adjustment (e.g., adjustment of the amount of light) is performed by the inkjet printing apparatus 300 side.

Meanwhile, when correction of color values (CMYK values) is performed only for a color that exceeds a limit value set in the above-described manner, grayscale continuity may be lost. More specifically, when correction of color values is performed only for a color that exceeds a limit value, output grayscale values (color values provided to the inkjet printing apparatus 300) are determined so as not to exceed a limit value schematically as shown in FIG. 17. As a result, as can be grasped from FIG. 17, a grayscale representation at a high grayscale portion is impaired. Hence, a limit value for each color (which is not an ink color but is a color in the sense of a combination of CMYK color values) may be provided such that grayscale continuity such as that schematically shown in FIG. 18 can be obtained. An example of how to determine a limit value for a color represented by (C value, M value, Y value, K value)=(Ci, Mi, Yi, Ki) will be described below.

First, an additional limit value LimitExK depending on the amount of a K color component (K value) is calculated by the following equation (1):

$$\text{Limit}ExK=(Ki/100)*(\text{MaxInk}-\text{MaxWith}K) \quad (1)$$

where MaxInk is the limit value for all four ink colors and MaxWithK is the limit value Z3 for a color including a K color component. Note that the limit value Z1 for a secondary color not including a K color component can be used as the limit value MaxInk for all four ink colors.

Then, an additional limit value LimitExCMY depending on the amount of a C color component (C value), the amount of an M color component (M value), and the amount of a Y color component (Y value) is calculated by the following equation (2):

$$\text{Limit}ExCMY=((Ci/100)*(Mi/100)*(Yi/100))^{\hat{}}(1.0/3.0) \\ *(\text{MaxInk}-\text{Max}CMY) \quad (2)$$

where MaxCMY is the limit value Z2 for a tertiary color not including a K color component.

Furthermore, a total additional limit value LimitEx is calculated by the following equation (3), and finally, a final limit value MaxInkOut for the color concerned is calculated by the following equation (4):

$$\text{Limit}Ex=\text{Limit}ExK+\text{Limit}ExCMY \quad (3)$$

$$\text{MaxInkOut}=\text{MaxInk}-\text{Limit}Ex \quad (4)$$

By this, regarding a color that exceeds the limit value MaxInkOut, conversion of color values is performed such that a total of color values of the four colors serving as output grayscale values (values corresponding to CMYK values in the CMYK data 54b in FIG. 13A) does not exceed the limit value MaxInkOut. As a result, the occurrence of tone jump (a phenomenon of losing grayscale continuity as described above) is suppressed when printing is performed.

In the above-described manner, a limit value of the amount of ink for when the inkjet printing apparatus 300 performs printing is set. In order that discharge of inks is performed depending on the set limit values, an amount-of-ink limitation color conversion table 63 which is used when print data Dpr is generated, or a gloss-priority color conversion table 11b for performing color conversion including color conversion using the table 63 is created. Upon creation of the amount-of-ink limitation color conversion table 63 or the gloss-priority color conversion table 11b, color values of four colors (CMYK values) serving as output grayscale values corresponding to color values of four colors (CMYK values) or color values of three colors (RGB values) serving as input grayscale values are determined such that the amount of ink discharged does not exceed a limit value set at the above-described step S52.

Upon creation of the amount-of-ink limitation color conversion table 63, regarding a color that includes a K color component and that exceeds a limit value set at the above-described step S52, it is preferred to reduce components other than the K color component (i.e., C value, M value, and Y value) on a priority basis. By this, a significant change in the appearance of colors (e.g., a reduction in contrast) associated with the limitations on the amounts of inks is suppressed. That is, print quality can be maintained.

Note that a conversion step is implemented by the above-described step S50, and a limit value setting step is implemented by the above-described step S52. In addition, a color value determination step is implemented by the process of determining color values of four colors (CMYK values) serving as output grayscale values, when creating an amount-of-ink limitation color conversion table 63.

<1.8 Gloss Determination Process>

Figure 19:
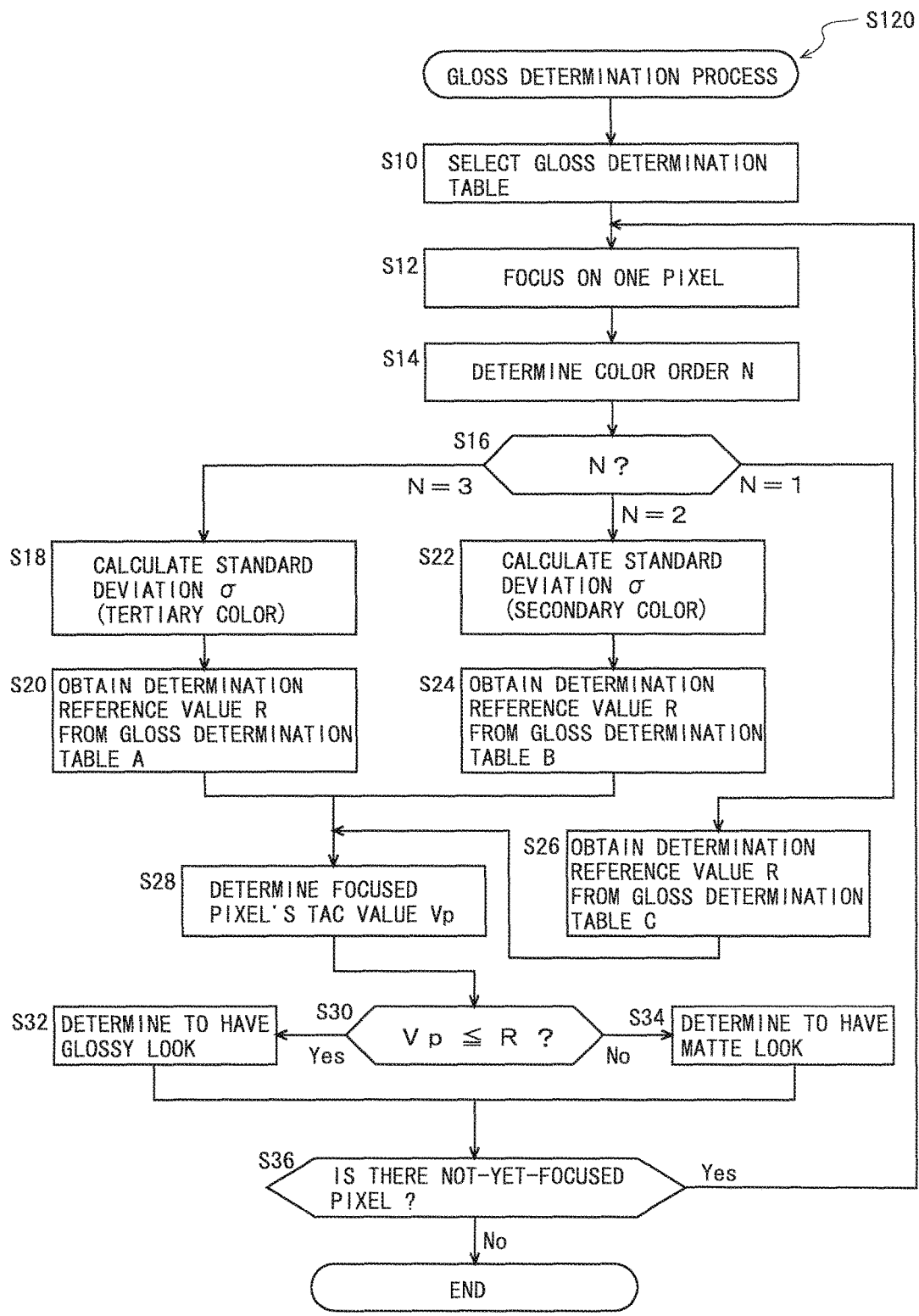
FIG. 19 is a flowchart showing a procedure of a gloss determination process included in the gloss quality preview process in the first embodiment.

FIG. 19 is a flowchart showing a procedure of the gloss determination process S120 in the gloss quality preview process shown in FIG. 5. In the gloss determination process S120, the image processing apparatus 200 functioning as a gloss determination device operates as follows.

The image processing apparatus 200 first obtains the type of base material and speed mode that are included in printing conditions specified by an operator's input operation or in printing conditions set in advance. Then, the image processing apparatus 200 selects a gloss determination table corresponding to the obtained type of base material and speed mode from among the plurality of gloss determination tables Tb1, Tb2, which are stored in advance in the auxiliary storage device 24, and loads three determination tables configuring the selected gloss determination table Tbs into the RAM 23, as determination tables A, B, and C (step S10). As already described, the determination table A is a table that associates a determination reference value with a combination of the amount of a K color component (0 to 100%) and the standard deviation of the amounts of color components in a tertiary color (e.g., FIG. 8), the determination table B is a table that associates a determination reference value with a combination of the amount of a K color component (0 to 100%) and the standard deviation of the amounts of color components in a secondary color (e.g., FIG. 9), and the determination table C is a table that associates a determination reference value with a combination of the amount of a K color component (0 to 100%) and the amount of a color component composing a primary color (e.g., FIG. 10).

After step S10, pixels in a print image represented by print data Dpr are sequentially focused, and it is determined whether the focused pixel has a glossy look or a matte look.

First, any one of not-yet-focused pixels in the print image is focused (step S12). Note that at a time point where step S12 is performed for the first time in the gloss determination process S120, all pixels in the print image are not yet focused.

Then, the number N of color components included in the focused pixel among three CMY color components is determined as a color order N (step S14), and it is determined whether the color order N is 1, 2, or 3 (step S16). Note that when the focused pixel does not include any color other than the K color component, N=0, but in the following, this case is also treated as N=1. The amount of a color component composing a primary color in this case is "0".

As a result of the determination at step S16, when N=3, i.e., when a color other than the K color component that is included in the focused pixel is a tertiary color, a standard deviation σ of the amounts of color components in the tertiary color is calculated (step S18). Specifically, the standard deviation σ is calculated by the following equation from the amount of a C color component Cp, the amount of a Y color component Yp, and the amount of an M color component Mp which are included in the focused pixel:

$$\sigma = \sqrt{[\{(Cp-\text{Avr})^2+(Mp-\text{Avr})^2+(Yp-\text{Avr})^2\}/3]} \quad (5a)$$

$$\text{Avr}=(Cp+Mp+Yp)/3 \quad (5b)$$

Thereafter, a determination reference value R associated with a combination of the amount of a K color component included in the focused pixel and the standard deviation σ of the amounts of color components in the tertiary color is obtained from the determination table A (step S20), and processing proceeds to step S28.

As a result of the determination at step S16, when N=2, i.e., when a color other than the K color component that is included in the focused pixel is a secondary color, a standard deviation σ of the amounts of color components in the secondary color is calculated (step S22). Specifically, the standard deviation σ is calculated by the following equation from the amount of a first color component $X1p$ and the amount of a second color component $X2p$ which compose the secondary color included in the focused pixel. Here, the first color component is any one of the CYM color components included in the focused pixel, and the second color component is any one of the CYM color components other than the first color component that is included in the focused pixel.

$$\sigma = \sqrt{[\{(X1p-\text{Avr})^2+(X2p-\text{Avr})^2\}/2]} \quad (6a)$$

$$\text{Avr}=(X1p+X2p)/2 \quad (6b)$$

Thereafter, a determination reference value R associated with a combination of the amount of a K color component included in the focused pixel and the standard deviation σ of the amounts of color components in the secondary color is obtained from the determination table B (step S24), and processing proceeds to step S28.

As a result of the determination at step S16, when N=1, i.e., when a color other than the K color component that is included in the focused pixel a primary color, a determination reference value R associated with a combination of the amount of a K color component included in the focused pixel and the amount of a color component composing the primary color is obtained from the determination table C (step S26) and processing proceeds to step S28.

At step S28, a TAC value indicating the sum total of the amount of a C color component Cp, the amount of an M color component Mp, the amount of a Y color component Yp, and the amount of a K color component Kp of the focused pixel (hereinafter, referred to as "focused pixel's TAC value") $Vp=Cp+Mp+Yp+Kp$ is calculated from the print data Dpr. Thereafter, it is determined whether the focused pixel's TAC value Vp is less than or equal to the determination reference value R which is obtained in the above-described manner (step S30). As a result of the determination, when the focused pixel's TAC value Vp is less than or equal to the determination reference value R, it is determined that the focused pixel has a glossy look (gloss quality is good) (step S32). When the focused pixel's TAC value Vp is greater than the determination reference value R, it is determined that the focused pixel has a matte look (gloss quality is not good) (step S34).

After thus making a determination as to whether the gloss quality of the focused pixel is good or not (glossy look or matte look), it is determined whether the print image has a not-yet-focused pixel (step S36). As a result of the determination, when there is no not-yet-focused pixel, the gloss determination process S120 ends since gloss quality has been determined for all pixels in the print image. On the other hand, when there is a not-yet-focused pixel, processing returns to step S12, and the processes at steps S12 to S36 are repeatedly performed until there is no more not-yet-focused pixel.

<1.9 Effects>

As described above, according to the present embodiment, a print image in a mode that allows the operator to verify the color quality and gloss quality of printed matter is displayed as a preview image before printing (FIGS. 4 and 6A and 6B). By the preview image, the gloss quality of printed matter can be verified beforehand in addition to color quality of the printed matter. As a result of the verification, when it is determined that the gloss quality is not good, for example, print data is generated using a gloss-priority color conversion table, by which printed matter that achieves a balance between color quality and gloss quality can be efficiently produced.

In addition, a determination reference value corresponding to the amount of a K color component and the standard deviation of the amounts of color components in YMC in each pixel is obtained from the above-described gloss determination table (determination tables A, B, and C), and gloss quality is determined based on the determination reference value (FIG. 19). Hence, gloss quality can be determined based on print data representing a print image, with a higher degree of accuracy than in conventional cases.

Furthermore, when the gloss-priority color conversion table 11b is used, a limit value of the amount of ink discharged is set for each of a secondary color not including a K color component, a tertiary color not including a K color component, and a color including a K color component. At that time, since the limit values for a color including a K color component and a color generating a gray component are set to relatively small values, curing failure can also be inhibited for colors that are conventionally likely to cause ink curing failure. By this, even when printing of an image including various colors is performed, the finish of all portions of printed matter is inhibited from having a matte look. By the above, when printing is performed using the photocurable inkjet printing apparatus 300, entirely-glossy-look, uniform printed matter can be obtained without causing ink curing failure.

In addition, by performing setting such that the limit value Z3 for a color including a K color component is smaller than the limit value Z2 for a tertiary color not including a K color component, the amount of ink discharged is effectively limited when performing printing of the color including a K color component. Thus, ink curing failure is more effectively inhibited.

Furthermore, by performing conversion from an input grayscale value to the amount of ink (step S50 of FIG. 14) based on the actual amount of ink consumed, the accuracy regarding inhibition of ink curing failure can be increased.

2. Second Embodiment

Figure 20:
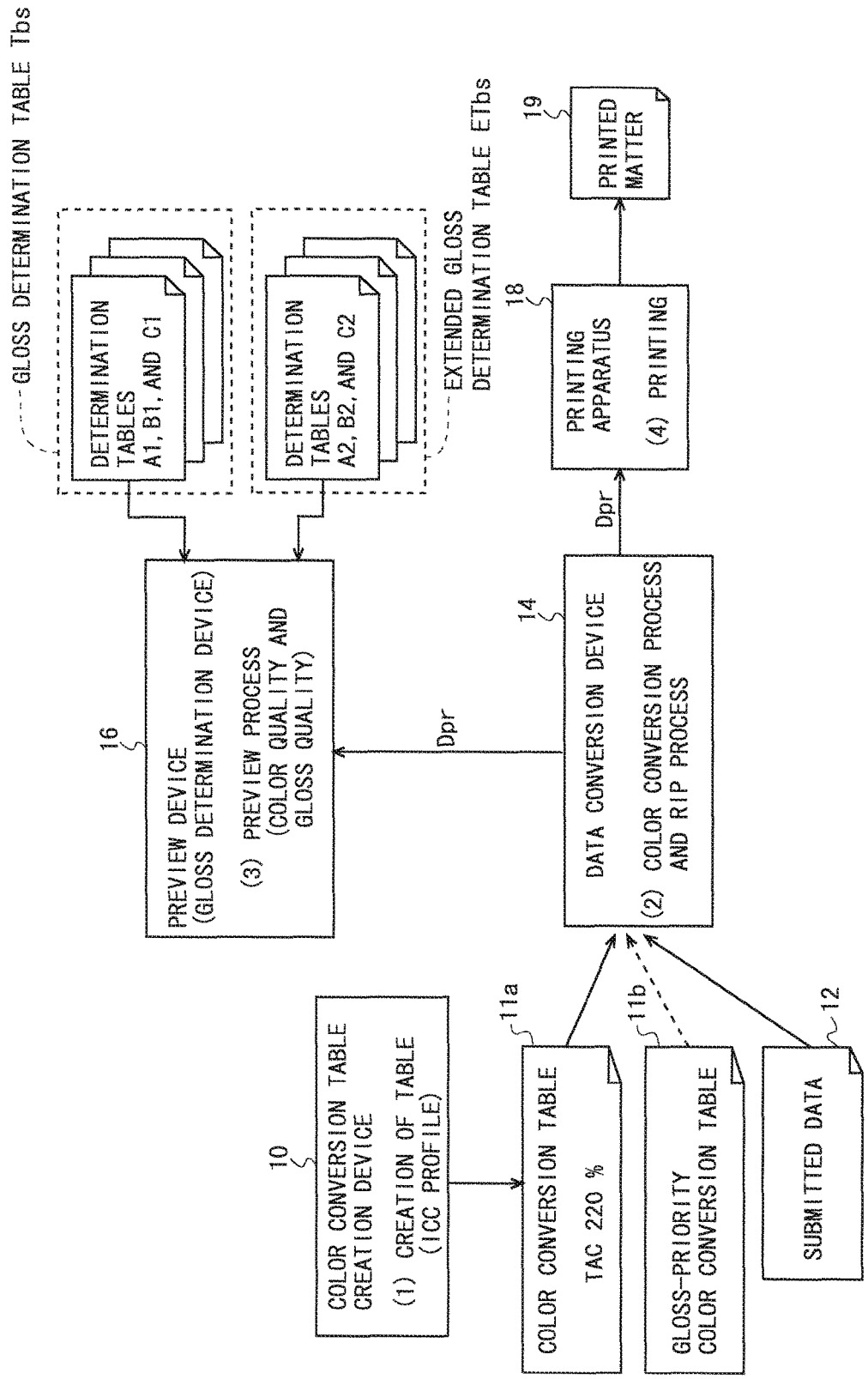
FIG. 20 is a diagram for describing an operation procedure in a printing system that uses a gloss determination device according to a second embodiment of the present invention.

Next, a gloss determination device according to a second embodiment of the present invention will be described. As with the above-described first embodiment, this gloss determination device is also used in the printing system shown in FIG. 1. Specifically, an image processing apparatus 200 (FIG. 3) included in the printing system also functions as a preview device 16b that performs preview display for verifying beforehand whether the color quality and gloss quality of printed matter are good or not (see FIGS. 4 and 20), by a CPU 21 loading a preview processing program installed on an auxiliary storage device 24 to a RAM 23 and executing the program. The preview device 16b has the function as a gloss determination device in addition to the function as a conventional color quality determination device, by a gloss determination process S120 shown in FIG. 5. However, the gloss determination process S120 for implementing the gloss determination device according to the present embodiment software-wise uses, as shown in FIG. 20, an extended gloss determination table (extended determination tables A2, B2, and C2) which will be described later, in addition to the same gloss determination table (determination tables A1, B1, and C1) as a gloss determination table (determination tables A, B, and C) which is used in a gloss determination process S120 in the first embodiment. First, the extended gloss determination table in the present embodiment will be described. Note that configurations of the present embodiment other than the gloss determination process S120 that uses the extended gloss determination table and configurations of the printing system related thereto are the same as the configurations of the first embodiment and the configurations of the printing system related thereto, and thus, the same or corresponding portions are denoted by the same reference characters and a detailed description thereof is omitted (see FIGS. 1 to 3).

<2.1 Extended Gloss Determination Table>

In the first embodiment, the total amount of ink (TAC value) for when a measured value (e.g., a measured value by 60-degree measurement) of the gloss level of printed matter is a predetermined reference gloss level (e.g., 50%) is set as an appropriate amount of ink (a limit value of the amount of ink) (see FIG. 7), the measured value being obtained by a gloss meter 230, and the printed matter being produced by an inkjet printing apparatus 300 serving as a printing apparatus 18. On the other hand, in the present embodiment, as the gloss level for determining an appropriate amount of ink, in addition to a first reference gloss level (e.g., 50%) that is the same reference gloss level as that of the first embodiment, a second reference gloss level (e.g., 40%) that is lower than the first reference gloss level but is determined by a person skilled in the art to be allowable is set. FIG. 21 shows appropriate amounts of ink (1) and (2) which are determined by the same method as that of the first embodiment. The appropriate amount of ink (1) represents, by a TAC value, an appropriate amount of ink corresponding to the first reference gloss level (50%), and the appropriate amount of ink (2) represents, by a TAC value, an appropriate amount of ink corresponding to the second reference gloss level (40%). According to FIG. 21, for example, in a case in which the base material is a white film and the print speed mode is standard (high speed), when printing is performed with a tertiary color (each of the amounts of CMY color components is 100%), the appropriate amount of ink (1) corresponding to the first reference gloss level is 160% and the appropriate amount of ink (2) corresponding to the second reference gloss level is 170%.

In the present embodiment, not only the determination tables A1, B1, and C1 (FIGS. 8 to 10) depending on the appropriate amount of ink (1) corresponding to the first reference gloss level (50%) are prepared for each set of printing conditions (each combination of the type of base material and speed mode) in the same manner as in the first embodiment, but also the extended determination tables A2, B2, and C2 depending on the appropriate amount of ink (2) corresponding to the second reference gloss level (40%) are prepared for each set of printing conditions. That is, the determination tables A1, B1, and C1 configuring the same gloss determination table as that of the first embodiment and the extended determination tables A2, B2, and C2 configuring the extended gloss determination table specific to the present embodiment are created in advance and stored in the auxiliary storage device 24 in the image processing apparatus 200. Here, the determination table A1 and the extended determination table A2 are tables that respectively associate a determination reference value and an extended determination reference value with a combination of the amount of a K color component (0 to 100%) and the standard deviation of the amounts of color components in a tertiary color, the determination table B1 and the extended determination table B2 are tables that respectively associate a determination reference value and an extended determination reference value with a combination of the amount of a K color component (0 to 100%) and the standard deviation of the amounts of color components in a secondary color, and the determination table C1 and the extended determination table C2 are tables that respectively associate a determination reference value and an extended determination reference value with a combination of the amount of a K color component (0 to 100%) and the amount of a color component composing a primary color.

Note that in the same manner as that of the method described with reference to FIG. 7, not only the determination tables A1, B1, and C1 but also the extended determination tables A2, B2, and C2 can be created by determining a limit value of the amount of ink discharged, based on the already described method for limiting the amount of ink discharged. For example, the extended determination table A can be created by determining a limit value of the amount of ink discharged based on the already described method for limiting the amount of ink discharged, while changing the amount of a K color component in a range of 0 to 100% and changing, with the amounts of any two color components of a tertiary color being set to 100%, the amount of the other one color component in a range of 0 to 100% (see FIG. 14, etc.), as shown in FIG. 22, and then setting a TAC value corresponding to the limit value at a corresponding location of the extended determination table A2, as an extended determination reference value.

<2.2 Gloss Determination Process>

Figure 23:
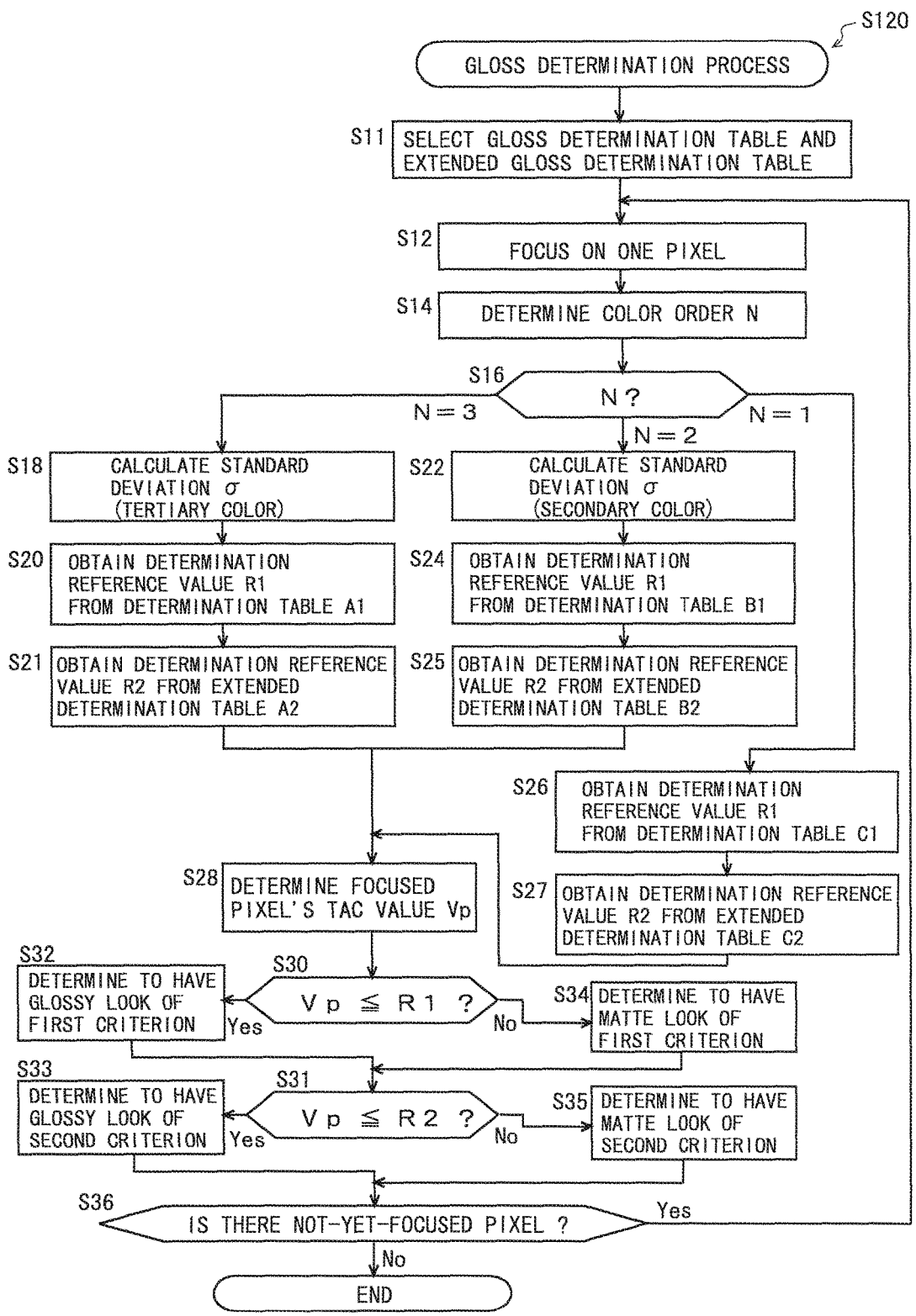
FIG. 23 is a flowchart showing a procedure of a gloss determination process included in a gloss quality preview process in the second embodiment.

FIG. 23 is a flowchart showing a procedure of the gloss determination process S120 (see FIG. 5) in the present embodiment. In the gloss determination process S120, the preview device 16b (image processing apparatus 200) functioning as a gloss determination device operates as follows. Note that in the following the same portions as those of the flowchart showing the procedure of the gloss determination process S120 in the first embodiment (FIG. 19) are denoted by the same step numbers and a detailed description thereof is omitted.

The preview device 16b first obtains the type of base material and speed mode that are included in printing conditions specified by an operator's input operation or in printing conditions set in advance. Then, the preview device 16b selects a gloss determination table and an extended gloss determination table corresponding to the obtained type of base material and speed mode from among a plurality of gloss determination tables and a plurality of extended gloss determination tables which are stored in advance in the auxiliary storage device 24, and loads three determination tables configuring the selected gloss determination table Tbs into the RAM 23 as determination tables A1, B1, and C1, and loads three extended determination tables configuring the selected extended gloss determination table ETbs into the RAM 23 as extended determination tables A2, B2, and C2 (step S11).

Thereafter, as with the first embodiment (FIG. 19), any one of not-yet-focused pixels in a print image represented by print data Dpr is focused (step S12), the number N of color components included in the focused pixel among three CMY color components is determined as a color order N (step S14), and it is determined whether the color order N is 1, 2, or 3 (step S16). Note that when the focused pixel does not include any color other than the K color component, N=0, but in the following, this case is also treated as N=1. The amount of a color component composing a primary color in this case is "0".

As a result of the determination at step S16, when N=3, i.e., when a color other than the K color component that is included in the focused pixel is a tertiary color, a standard deviation a of the amounts of color components in the tertiary color is calculated (step S18). Thereafter, a determination reference value associated with a combination of the amount of a K color component included in the focused pixel and the standard deviation of the amounts of color components in the tertiary color is obtained as a first determination reference value R1 from the determination table A1 (step S20), and an extended determination reference value associated with a combination of the amount of a K color component included in the focused pixel and the standard deviation a of the amounts of color components in the tertiary color is obtained as a second determination reference value R2 from the extended determination table A2 (step S21). Thereafter, processing proceeds to step S28.

As a result of the determination at step S16, when N=2, i.e., when a color other than the K color component that is included in the focused pixel is a secondary color, a standard deviation a of the amounts of color components in the secondary color is calculated (step S22). Thereafter, a determination reference value associated with a combination of the amount of a K color component included in the focused pixel and the standard deviation σ of the amounts of color components in the secondary color is obtained as a first determination reference value R1 from the determination table B1 (step S24), and an extended determination reference value associated with a combination of the amount of a K color component included in the focused pixel and the standard deviation σ of the amount of color components in the secondary color is obtained as a second determination reference value R2 from the extended determination table B2 (step S25). Thereafter, processing proceeds to step S28.

As a result of the determination at step S16, when N=1, i.e., when a color other than the K color component that is included in the focused pixel is a primary color, a determination reference value associated with a combination of the amount of a K color component included in the focused pixel and the amount of a color component composing the primary color is obtained as a first determination reference value R1 from the determination table C1 (step S26), and an extended determination reference value associated with a combination of the amount of a K color component included in the focused pixel and the amount of a color component composing the primary color is obtained as a second determination reference value R2 from the extended determination table C2 (step S27). Thereafter, processing proceeds to step S28.

At step S28, a TAC value indicating the sum total of the amount of a C color component Cp, the amount of an M color component Mp, the amount of a Y color component Yp, and the amount of a K color component Kp of the focused pixel (hereinafter, referred to as "focused pixel's TAC value") $Vp=Cp+Mp+Yp+Kp$ is calculated from the print data Dpr. Thereafter, it is determined whether the focused pixel's TAC value Vp is less than or equal to the first determination reference value R1 (step S30). As a result of the determination, when the focused pixel's TAC value Vp is less than or equal to the first determination reference value R1, it is determined that the focused pixel has a "glossy look of a first criterion" (gloss quality is good by the first criterion) (step S32). When the focused pixel's TAC value Vp is greater than the first determination reference value R1, it is determined that the focused pixel has a "matte look of the first criterion" (gloss quality is not good by the first criterion) (step S34).

Subsequently, it is determined whether the focused pixel's TAC value Vp is less than or equal to the second determination reference value R2 (step S31). As a result of the determination, when the focused pixel's TAC value Vp is less than or equal to the second determination reference value R2, it is determined that the focused pixel has a "glossy look of a second criterion" (gloss quality is good by the second criterion) (step S33). When the focused pixel's TAC value Vp is greater than the second determination reference value R2, it is determined that the focused pixel has a "matte look of the second criterion" (gloss quality is not good by the second criterion) (step S35).

After thus making a determination as to whether the gloss quality of the focused pixel is good or not (glossy look or matte look), using two criteria (first and second criteria) that are based on the first and second determination reference values R1 and R2, it is determined whether the print image has a not-yet-focused pixel (step S36). As a result of the determination, when there is no not-yet-focused pixel, the gloss determination process S120 ends since gloss quality has been determined for all pixels in the print image. On the other hand, when there is a not-yet-focused pixel, processing returns to step S12, and the processes at steps S12 to S36 are repeatedly performed until there is no more not-yet-focused pixel.

<2.3 Operation Procedure in the Printing System>

FIG. 20 is a diagram for describing an operation procedure in a printing system that uses the gloss determination device according to the present embodiment. As shown in FIG. 20, the operation procedure in the printing system is the same as the operation procedure in the printing system that uses the gloss determination device according to the first embodiment (FIG. 4), except for an operation in the preview device 16b having the function of a gloss determination device. Note that FIGS. 4 and 20 both show an operation procedure performed after generation of submitted data 12.

As already described, in the present embodiment, a determination by the first criterion as to whether gloss quality is good or not (glossy look or matte look of the first criterion) and a determination by the second criterion as to whether gloss quality is good or not (glossy look or matte look of the second criterion) are provided as the results of determination in the gloss determination process S120 (see steps S32 to S35 of FIG. 23). Hence, in a preview process S130 in the present embodiment, a print image is displayed as a preview image on the preview device 16b (image processing apparatus 200) in a mode that allows an operator to verify both of the determination as to whether gloss quality is good or not by the first criterion and the determination as to whether gloss quality is good or not by the second criterion. For example, a poor glossy area by the first criterion (an area including pixels having a matte look of the first criterion) and a poor glossy area by the second criterion (an area including pixels having a matte look of the second criterion) are displayed in different specific colors or displayed having different types of hatching. Alternatively, the display state of the preview image may be switched between a state in which a poor glossy area by the first criterion is displayed and a state in which a poor glossy area by the second criterion is displayed.

By viewing such a preview image, the operator can verify beforehand (before printing) the gloss quality of printed matter based on image display showing a determination as to whether the gloss quality is good or not by the first criterion and a determination as to whether the gloss quality is good or not by the second criterion which is a looser criterion than the first criterion, in addition to color quality of the printed matter. Therefore, the operator can more appropriately determine whether the gloss quality is good or not, depending on the situation regarding printed matter to be produced.

As a result of such verification using the preview image, when the operator determines that both color quality and gloss quality are good (a balance between color quality and gloss quality is achieved), print data Dpr is sent to the printing apparatus 18, and the inkjet printing apparatus 300 serving as the printing apparatus 18 performs printing using the print data Dpr. On the other hand, when the operator having viewed the preview image determines that either color quality or gloss quality is not good, a color conversion table is recreated depending on the result of the determination, and a data conversion process S110→a gloss determination process S120→a preview process S130 are repeated until both color quality and gloss quality are in good condition (a state in which a balance between color quality and gloss quality is achieved). Note that when the operator having viewed the preview image determines that only gloss quality is not good, as with the first embodiment, print data Dpr is regenerated using a gloss-priority color conversion table 11b (see FIGS. 13A and 13B), by which repetition of operations of the above-described data conversion process S110→gloss determination process S120→preview process S130 can be suppressed.

<2.4 Effects>

As described above, according to the present embodiment, as with the first embodiment, a print image is displayed as a preview image in a mode that allows the operator to verify the color quality and gloss quality of printed matter before printing (FIG. 20). In the gloss determination process S120 for obtaining the preview image, in the first embodiment, a determination as to whether gloss quality is good or not is made by only one criterion that is based on one type of determination tables A, B, and C (see steps S30 to S34 of FIG. 19), and thus, regardless of whether a focused pixel's TAC value Vp slightly exceeds a determination reference value R (e.g., exceeds several %) or significantly exceeds the determination reference value R (e.g., exceeds several tens of %), the focused pixel is treated in the same manner as having a matte look. On the other hand, in the present embodiment, a determination as to whether gloss quality is good or not is made using two criteria: the first criterion that is based on the determination tables A1, B1, and C1, and the second criterion that is based on the extended determination tables A2, B2, and C2 (see steps S30 to S35 of FIG. 23). By this, even when a given pixel is determined to have a matte look by the first criterion, since the pixel may be determined to have a glossy look by the second criterion which is looser than the first criterion, an image with a small degree of a matte look can be allowed. Hence, since the operator can verify gloss quality based on a preview image showing whether the gloss quality is good or not that is determined using such two criteria, the operator can more appropriately determine whether the gloss quality is good or not (whether print data is to be regenerated due to poor gloss), depending on the situation regarding printed matter to be produced. As a result, the operation efficiency in the printing system also improves (see FIG. 20).

3. Variants

Although in the above-described embodiments a TAC value is adopted as a determination reference value set in each determination table, the present invention is not limited thereto. For the determination reference value, the amount of ink adhered, the actual amount of ink, or the amount of ink consumed can be adopted. In this case, the accuracy of gloss determination can be improved compared to the case of adopting a TAC value.

Although in the above-described embodiments it is premised on a printing system that uses four CMYK colors as ink colors, the present invention is not limited thereto. Even in a printing system that uses photocurable inks of five or more colors (the color K and four or more colors other than the color K), a gloss determination device that can determine gloss quality taking into account the color K and a combination of colors generating a gray component can be provided by the present invention. In addition, although a standard deviation is used as an index indicating the generation of a gray component by a combination of CMY colors (it is assumed that the smaller the standard deviation of the amounts of color components other than the K color component, the larger the amount of gray component), other indices indicating dispersion may be used instead of the standard deviation.

In the above-described embodiments, a determination as to whether gloss quality is good or not (whether a glossy look or a matte look) is made for each pixel in a print image, using print data Dpr in bitmap format (FIGS. 19 and 23). However, the present invention is not limited to a configuration where a determination as to whether gloss quality is good or not is thus made for each pixel, and any configuration may be adopted as long as a determination as to whether gloss quality is good or not can be made for each predetermined unit image. For example, the configuration may be such that using page data where a print target is described in a page description language (e.g., data in PDF format), a determination as to whether gloss quality is good or not is made for each image object (a character, a line drawing, a pattern, etc.) forming the page data.

Although in the second embodiment an extended gloss determination table (extended determination tables A2, B2, and C2) is used in addition to the same gloss determination table (determination tables A1, B1, and C1) as a gloss determination table of the first embodiment, an extended gloss determination table that is created based on a further different reference gloss level may be added, and a determination as to whether gloss quality is good or not may be made based on three or more types of criteria. According to such a configuration, more margin can be provided to the determination criterion for gloss quality.

Although the present invention is described in detail above, the above description is to be considered in all, respects as illustrative and not restrictive. It is to be understood that a variety of other changes and modifications can be made without departing from the true spirit and scope of the present invention.

Note that this application claims priority based on Japanese Patent Application No. 2015-141170 filed on Jul. 15, 2015 and entitled "Method for Limiting Amount of Ink Discharged and Method for Creating Color Conversion Table Using Same" and Japanese Patent Application No. 2015-189890 filed on Sep. 28, 2015 and entitled "Gloss Determination Device, Gloss Determination Program, and Gloss Determination Method", the contents of which are incorporated herein by reference.

What is claimed is:

1. A method for limiting an amount of ink discharged in a photocurable inkjet printing apparatus that performs printing using inks of four CMYK colors, the method comprising:
    a conversion step of converting, for each ink color, an input grayscale value to an amount of ink; and
    a limit value setting step of setting a limit value limiting a total amount for inks to be discharged, the total amount for inks being, obtained in the conversion step, the limit value including a first limit value limiting a total amount for all inks of a secondary color not including a K color component, a second limit value limiting a total amount for all inks of a tertiary color not including a K color component, and a third limit value limiting a total amount for all inks of a color including a K color component, wherein the second limit value is smaller than the first limit value, and the third limit value is smaller than the first limit value,
    the limit value itself differs among the color including the K color component, the secondary color not including the K color component, and the tertiary color not including the K color component.

2. The method for limiting an amount of ink discharged according to claim 1, wherein the third limit value is smaller than the first limit value.

3. The method for limiting an amount of ink discharged according to claim 1, wherein in the conversion step, the conversion from an input grayscale value to an amount of ink is performed based on an actual amount of ink consumed when the photocurable inkjet printing apparatus has performed printing in advance.

4. A method for creating a color conversion table for converting, for each of colors represented by combinations of color values of four CMYK colors, color values of the four colors serving as input grayscale values into color values of the four colors serving as output grayscale values to be provided to a photocurable inkjet printing apparatus, the method comprising:
    a conversion step of converting, for each ink color, an input grayscale value to an amount of ink;
    a limit value setting step of setting a limit value limiting a total amount for inks to be discharged, the total amount for inks being obtained in the conversion step, the limit value including a first limit value limiting a total amount for all inks of a secondary color not including a K color component, a second limit value limiting a total amount for all inks of a tertiary color not including a K color component, and a third limit value limiting a total amount for all inks of a color including a K color component; and
    a color value determination step of determining color values of the four colors serving as output grayscale values corresponding to color values of the four colors serving as input grayscale values such that the total amount for inks discharged does not exceed the limit values set in the limit value setting step, wherein
    the second limit value is smaller than the limit value, and the third limit value is smaller than the first limit value,
    the limit value itself differs among the color including the K color component, the secondary color not including the K color component, and the tertiary color not including the K color component.

5. The method for creating a color conversion table according to claim 4, wherein in the color value determination step, for a color that includes a K color component and that exceeds a limit value set in the limit value setting step, color values of the four colors serving as output grayscale values are determined such that components other than the K color component are reduced on a priority basis.

6. A method for limiting an amount of ink discharged in a photocurable inkjet printing apparatus that performs printing using inks of four CMYK colors, the method comprising:
    a conversion step of converting, for each ink color, an input grayscale value to an amount of ink; and
    a limit value setting step of setting, regarding the amount of ink obtained in the conversion step, a limit value of an amount of ink discharged, for each of a secondary color not including a K color component, a tertiary color not including K color component, and a color including a K color component, wherein
    in the limit value setting step, the limit value for the tertiary color not including a K color component is set to a smaller value than the limit value for the secondary color not including a K color component, and the limit value for the color including a K color component is set to a smaller value than the limit value for the secondary color not including a K color component,
    in the limit value setting step, the limit value of an amount of ink discharged is set for each color, depending on magnitudes of a C color component, an M color component, a Y color component, and a K color component, and
    the limit value setting step includes, as steps for determining the limit value for each color,
    calculating an additional limit value LimitExK depending on a value of a K color component by the following equation (1),
    calculating an additional limit value LimitExCMY depending on a value of a c color component, a value of an M color component, and a value of a Ycolor component by the following equation (2), calculating a total additional limit value LimitEx by the following equation (3), and calculating a limit value MaxInkOut by the following equation (4), $$\text{Limit}ExK = (Ki/F) * (\text{MaxInk} - \text{MaxWith}K) \quad (1)$$

$$\text{Limit}ExCMY = ((Ci/F)*(Mi/F)*(Yi/F))\textasciicircum(1.0/3.0) * (\text{Maxink} - \text{Max}CMY) \quad (2)$$

$$\text{Limit}Ex = \text{Limit}ExK + \text{Limit}ExCMY \quad (3)$$

$$\text{MaxInkOut} = \text{MaxInk} - \text{Limit}Ex \quad (4)$$

where Ki is a value of the K color component, F is a predetermined factor, MaxInk is a limit value for all four ink colors, MaxWithK is a limit value for colors including a K color component, Ci is a value of the C color component, Mi is a value of the M color component, Yi is a value of the Y color component, and MaxCMY is a limit value for tertiary colors not including a K color component.

\* \* \* \* \*